US012652248B2

(12) United States Patent
Wu et al.

(10) Patent No.: US 12,652,248 B2
(45) Date of Patent: Jun. 9, 2026

(54) ADDRESS DETECTION METHOD AND APPARATUS

(71) Applicant: HUAWEI TECHNOLOGIES CO., LTD., Shenzhen (CN)

(72) Inventors: Ling Wu, Shanghai (CN); Qi He, Shanghai (CN); Yanqiao Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 18/675,665

(22) Filed: May 28, 2024

(65) Prior Publication Data

US 2024/0314071 A1 Sep. 19, 2024

Related U.S. Application Data

(63) Continuation of application No. PCT/CN2022/125704, filed on Oct. 17, 2022.

(30) Foreign Application Priority Data

Nov. 30, 2021 (CN) .......................... 202111447275.6

(51) Int. Cl.
H04L 45/74 (2022.01)
H04L 45/03 (2022.01)

(52) U.S. Cl.
CPC .............. H04L 45/74 (2013.01); H04L 45/03 (2022.05)

(58) Field of Classification Search
None
See application file for complete search history.

(56) References Cited

U.S. PATENT DOCUMENTS

| | | | | |
|---|---|---|---|---|
| 2004/0063402 A1* | 4/2004 | Takeda | .................... | H04W 8/12 |
| | | | | 455/446 |
| 2007/0168520 A1* | 7/2007 | Perkins | .............. | H04W 60/005 |
| | | | | 709/227 |

(Continued)

FOREIGN PATENT DOCUMENTS

| | | |
|---|---|---|
| CN | 101764734 A | 6/2010 |
| CN | 102246461 B | 8/2013 |

(Continued)

OTHER PUBLICATIONS

Guangjia Song et al.:"Review of Address Resolution Process Attacks and Prevention Research", 2013 Third International Conference on Instrumentation, Measurement, Computer, Communication and Control, IEEE, Sep. 21, 2013 (Sep. 21, 2013), pp. 994-998, XP032609621, DOI: 10.1109/IMCCC.2013.221.

(Continued)

*Primary Examiner* — Phyllis A Book
(74) *Attorney, Agent, or Firm* — WOMBLE BOND DICKINSON (US) LLP

(57) ABSTRACT

This application provides an address detection method and a related apparatus. The method includes: receiving a first internet protocol (internet protocol, IP) address from a first device, where the first IP address is a to-be-detected IP address of the first device; determining a first information table, where the first information table includes an IP address of one or more devices, and the one or more devices and a first apparatus are at a media access control layer of a same (Continued)

network; determining a second information table based on the first information table; and detecting whether a second IP address that is the same as the first IP address exists in the second information table, where a first media access control address corresponding to the first IP address is different from a second media access control address corresponding to the second IP address.

20 Claims, 7 Drawing Sheets

(56) References Cited

U.S. PATENT DOCUMENTS

| | | | | |
|---|---|---|---|---|
| 2008/0031189 | A1 | 2/2008 | Choi et al. | |
| 2013/0070745 | A1* | 3/2013 | Nixon .................. | H04W 84/02 370/328 |
| 2021/0075759 | A1* | 3/2021 | Mandal .................. | H04L 61/58 |

FOREIGN PATENT DOCUMENTS

| | | | | | | |
|---|---|---|---|---|---|---|
| CN | 104079481 | A | * | 10/2014 | ............. | H04L 45/00 |
| CN | 111629077 | A | * | 9/2020 | ......... | H04L 61/5046 |
| CN | 112152928 | A | | 12/2020 | | |
| KR | 20080012729 | A | | 2/2008 | | |
| WO | WO-2012031487 | A1 | * | 3/2012 | ............. | H04L 45/66 |
| WO | WO-2012142750 | A1 | * | 10/2012 | ........... | H04L 45/745 |

OTHER PUBLICATIONS

"Neighbor Discovery for IP version 6(1Pv6)"; T. Narten, E. Nordmark, W. Simpson, H. Soliman; Sep. 2007. Request for Comments: 4861. Total 97 pages.
"Duplicate Address Detection Proxy", F. Costa. X. Pougnard, H. Li. Jun. 2013; ISSN: 2070-1721; Request for Comments: 6957. Total 16 pages.

* cited by examiner

ADDRESS DETECTION METHOD AND APPARATUS

CROSS-REFERENCE TO RELATED APPLICATIONS

This application is a continuation of International Application No. PCT/CN2022/125704, filed on Oct. 17, 2022, which claims priority to Chinese Patent Application No. 202111447275.6, filed on Nov. 30, 2021. The disclosures of the aforementioned applications are incorporated herein by reference in these entireties.

TECHNICAL FIELD

This application relates to the field of communication technologies, and in particular, to an address detection method and a related apparatus.

BACKGROUND

In a communication system, to avoid a case in which two user equipments have an identical internet protocol version 6 (IPv6) address, before using an IPv6 address, a user equipment needs to detect and determine, by using a duplicate address detection (DAD) process in a neighbor discovery (ND) protocol, whether the address of the user equipment is duplicate on a same link, to ensure uniqueness of the address.

A plurality of user equipments added to a same link cannot communicate with each other through an access node (AN), and all messages are received and sent through a broadband network gateway (BNG). Therefore, in this networking scenario, a DAD proxy may be set on the BNG, to help complete the DAD process needed by IPv6 nodes on different user equipments under a split horizon condition.

The BNG may not only support the DAD proxy, but also establish and maintain a binding table and a neighbor cache that are of a proxied user equipment. The binding table stores an IPv6 address of the device and a media access control (MAC) address corresponding to the IPv6 address, and the neighbor cache stores an IPv6 address of one or more devices that are at a MAC layer of a same network with the BNG and a MAC address associated with the IPv6 address. When a user equipment sends a DAD solicitation for a to-be-detected IPv6 address to the BNG, the BNG may query whether an address that is the same as the to-be-detected IPv6 address exists in the binding table. If the binding table has the address that is the same as the to-be-detected IPv6 address and MAC addresses are different, the BNG queries whether an address that is the same as the to-be-detected IPv6 address exists in the neighbor cache. If the address that is the same as the to-be-detected IPv6 address exists in the neighbor cache, the BNG advertises, to the user equipment, that the address is duplicate.

However, when the binding table and/or the neighbor cache are/is lost, duplicate address detection fails. Therefore, how to improve accuracy of IPv6 duplicate address detection is an urgent problem to be resolved.

SUMMARY

Embodiments of this application provide an address detection method and an apparatus, to improve accuracy of duplicate address detection.

According to a first aspect, this application provides an address detection method. The method may be applied to a first apparatus, or may be applied to a module (for example, a chip) in the first apparatus. The following uses an example in which the method is applied to the first apparatus for description. The method may include: receiving a first internet protocol (IP) address from a first device, where the first IP address is a to-be-detected IP address of the first device; determining a first information table, where the first information table includes an IP address of one or more devices, and the one or more devices and the first apparatus are at a MAC layer of a same network; determining a second information table based on the first information table; and detecting whether a second IP address that is the same as the first IP address exists in the second information table, where a first media access control address corresponding to the first IP address is different from a second media access control address corresponding to the second IP address.

In this solution provided in this application, a BNG may not only support a DAD proxy, but also establish and maintain a binding table (for example, the second information table) and a neighbor cache (for example, the first information table) of a proxied device. The binding table stores an IP (for example, IPv6) address of a device that solicits address detection, and the neighbor cache stores an IP address of one or more devices that are at a MAC layer of a same network with the first apparatus. When a device sends a DAD solicitation for a to-be-detected IP address to the BNG, the BNG may query whether an address that is the same as the to-be-detected IP address exists in the binding table and MAC addresses corresponding to the IP addresses are different, and then query whether an address that is the same as the to-be-detected IP address exists in the neighbor cache and a state of an entry corresponding to the IP address is a reachable state. If the address that is the same as the to-be-detected IP address exists in the binding table and the address that is the same as the to-be-detected IP address exists in the neighbor cache, the BNG advertises, to the device, that the address is duplicate. However, in an abnormal scenario in which an IP DAD proxy network element is restarted, the binding table exceeds a specification, or the like, at least one of the binding table and the neighbor cache used for DAD detection is abnormal. In a conventional technology, that the at least one of the binding table and the neighbor cache is abnormal causes inaccurate duplicate address detection. In the technical solution of an embodiment of the application, when the at least one of the binding table and the neighbor cache is abnormal, the binding table may be updated based on the neighbor cache. For example, when the IP DAD proxy network element is restarted and the binding table does not exist, a new binding table may be created, and IP address information in the neighbor cache that triggers updating by using a service is stored in the newly created binding table. In this way, when a device initiates IP address detection, whether a to-be-detected IP address is duplicate may be detected based on the binding table and the neighbor cache, thereby improving accuracy of duplicate address detection.

In an embodiment, the determining a second information table based on the first information table includes: updating the second information table based on the first information table.

In an embodiment of the application, when the duplicate address detection is inaccurate because the at least one of the binding table and the neighbor cache is abnormal, the binding table is updated based on the neighbor cache, so that when a device initiates IP address detection, whether a to-be-detected IP address is duplicate may be detected based on the binding table and the neighbor cache, thereby improving accuracy of duplicate address detection.

In an embodiment, the determining a second information table based on the first information table includes: creating the second information table, where the created second information table includes the IP address of the one or more devices in the first information table.

In the solution provided in this application, when the binding table does not exist, the first apparatus may first create a new binding table, and then update the created binding table based on the neighbor cache, so as to implement address detection and improve accuracy of duplicate address detection.

In an embodiment, the determining a first information table includes: receiving a first neighbor solicitation (NS) message from a second device, where the first NS message includes a second IP address and the second media access control address, and the second IP address is an IP address of the second device; and storing the second IP address and the second media access control address into a first entry in the first information table, where a state of the first entry is a reachable state.

In the solution provided in this application, when the neighbor cache exists and the binding table does not exist, when sending service data to the first apparatus, the second device needs to first obtain a MAC address of the first apparatus, that is, send, to the first apparatus, a solicitation message used to solicit the MAC address of the first apparatus. In an embodiment, the second device may send an NS message including a second IP address to the first apparatus, so that the first apparatus determines that the second device is a device that is at a MAC layer of a same network with the first apparatus, and updates and stores the received second IP address into the neighbor cache. In an embodiment, if the second IP address does not exist in the neighbor cache, the second IP address is stored in an entry in the neighbor cache, and a state of the entry is a reachable state. Alternatively, if the second IP address already exists in the neighbor cache, a state of an entry corresponding to the second IP address is changed to a reachable state. In this way, the first apparatus may determine the neighbor cache, so as to determine the binding table based on the neighbor cache. When a device initiates IP address detection, whether a to-be-detected IP address is truly duplicate may be detected based on the binding table and the neighbor cache, thereby improving accuracy of duplicate address detection.

In an embodiment, the determining a first information table includes: sending a second NS message to a second device; receiving a second neighbor advertisement (NA) message from the second device, where the second NA message includes a second IP address and the second media access control address, and the second IP address is an IP address of the second device; and storing the second IP address and the second media access control address into a first entry in the first information table, where a state of the first entry is a reachable state.

In the solution provided in this application, when the neighbor cache exists and the binding table does not exist, when sending service data to the second device, the first apparatus needs to first obtain a MAC address of the second device, that is, send, to the second device, a solicitation message used to solicit the MAC address of the second device. In an embodiment, the first apparatus may send an NS message to the second device and receive an NA message that is from the second device and that includes the second IP address, so that the first apparatus determines that the second device is a device that is at a MAC layer of a same network with the first apparatus, and updates and stores the received second IP address into the neighbor cache. In an embodiment, if the second IP address does not exist in the neighbor cache, the second IP address is stored in an entry in the neighbor cache, and a state of the entry is a reachable state. Alternatively, if the second IP address already exists in the neighbor cache, a state of an entry corresponding to the second IP address is changed to a reachable state. In this way, the first apparatus may determine the neighbor cache, so as to determine the binding table based on the neighbor cache. When a device initiates IP address detection, whether a to-be-detected IP address is truly duplicate may be detected based on the binding table and the neighbor cache, thereby improving accuracy of duplicate address detection.

In an embodiment, the determining a first information table includes: sending a third NS message to a plurality of devices based on the first IP address of the first device, where a target address of the third NS message is the first IP address, the plurality of devices belong to a same link, and the plurality of devices include a second device; receiving a third NA message from the second device, where the third NA message includes a second IP address and the second media access control address, the second IP address is an IP address of the second device, and the second IP address is the same as the first IP address; and determining the first information table based on the second IP address and the second media access control address. An implementation of sending the third NS message to the plurality of devices may be implemented in a multicast manner. This is not limited in this application. The method may also be applicable to descriptions of another aspect, and details are not described subsequently.

In the solution provided in this application, when the binding table exists and the neighbor cache does not exist or a state of an entry in the neighbor cache is an unreachable state, because the first information table stores an IP address of a device that is at a MAC layer of a same network with the first apparatus, when determining the first information table, the first apparatus may determine which devices of all devices on a same link with the first apparatus are devices that are at the MAC layer of the same network with the first apparatus. When receiving the first IP address of the first device, the first apparatus sends, to all the devices on the same link with the first apparatus, a solicitation message used to solicit IP addresses of the devices that are at the MAC layer of the same network with the first apparatus. When a device sends a response message, it may be determined that the device and the first apparatus are at the MAC layer of the same network, and a state of an entry corresponding to an IP address of the device is a reachable state. This may alternatively be understood as that it may be determined that an IP address of the device is available. Therefore, the neighbor cache may be determined based on the IP address of the device that sends the response message, so that the binding table is determined based on the neighbor cache. When a device initiates IP address detection, whether a to-be-detected IP address is truly duplicate may be detected based on the binding table and the neighbor cache, thereby improving accuracy of duplicate address detection.

In an embodiment, the determining the first information table based on the second IP address and the second media access control address includes: creating the first information table when the first information table does not exist, where the first information table includes the second IP address and the second media access control address, and a state of the first information table is a reachable state.

In the solution provided in this application, when the binding table exists and the neighbor cache does not exist, because the first information table stores an IP address of a device that is at a MAC layer of a same network with the first apparatus, when determining the first information table, the first apparatus may determine which devices of all devices on a same link with the first apparatus are devices that are at the MAC layer of the same network with the first apparatus. When receiving the first IP address of the first device, the first apparatus sends, to all the devices on the same link with the first apparatus, a solicitation message used to solicit IP addresses of the devices that are at the MAC layer of the same network with the first apparatus. When a device sends a response message, it may be determined that the device and the first apparatus are at the MAC layer of the same network, and a state of an entry corresponding to an IP address of the device is a reachable state. This may alternatively be understood as that it may be determined that an IP address of the device is available. When the neighbor cache does not exist, a new neighbor cache in an incomplete state is created. The IP address of the device is stored in the newly created neighbor cache, and a state of an entry corresponding to the IP address in the neighbor cache is changed to a reachable state. In this way, the first apparatus determines the neighbor cache, so as to determine the binding table based on the neighbor cache. When a device initiates IP address detection, whether a to-be-detected IP address is truly duplicate may be detected based on the binding table and the neighbor cache, thereby improving accuracy of duplicate address detection.

In an embodiment, the determining the first information table based on the second IP address and the second media access control address includes: when a state of a first entry in the first information table is an unreachable state, changing the state of the first entry to a reachable state, where the first entry includes the second IP address and the second media access control address.

In the solution provided in this application, when the binding table exists and a state of an entry in the neighbor cache is an unreachable state, because the first information table stores an IP address of a device that is at a MAC layer of a same network with the first apparatus, when determining the first information table, the first apparatus may determine which devices of all devices on a same link with the first apparatus are devices that are at the MAC layer of the same network with the first apparatus. When receiving the first IP address of the first device, the first apparatus sends, to all the devices on the same link with the first apparatus, a solicitation message used to solicit IP addresses of the devices that are at the MAC layer of the same network with the first apparatus. When a device sends a response message, it may be determined that the device and the first apparatus are at the MAC layer of the same network, and a state of an entry corresponding to an IP address of the device is a reachable state. This may alternatively be understood as that it may be determined that an IP address of the device is available. When the state of the entry in the neighbor cache is the unreachable state, the IP address stored in the neighbor cache is updated by using the IP address of the device, and a state of an entry corresponding to the IP address is changed to a reachable state. In this way, the first apparatus determines the neighbor cache, so as to determine the binding table based on the neighbor cache. When a device initiates IP address detection, whether a to-be-detected IP address is truly duplicate may be detected based on the binding table and the neighbor cache, thereby improving accuracy of duplicate address detection.

In an embodiment, the sending a third NS message to a plurality of devices based on the first IP address of the first device includes: when receiving an address detection solicitation from the first device, sending the third NS message to the plurality of devices, where the address detection solicitation includes the first IP address.

In the solution provided in this application, when receiving an address detection solicitation of a device, the first apparatus immediately sends, to all the devices on the same link with the first apparatus, a solicitation message used to solicit IP addresses of the devices that are at the MAC layer of the same network with the first apparatus. In the conventional technology, it takes 5 s (seconds) to detect whether an IP address is available. Actually, a default address detection periodicity of most first apparatuses is 1 s. When an actual detection result of the IP address is obtained, the IP address has been determined as available and valid, causing a service fault. In an embodiment of the application, when a to-be-detected IP address of a device is received, a solicitation message used to solicit an IP address of a device that is at the MAC layer of the same network with the first apparatus is immediately sent to all the devices on the same link with the first apparatus, so that an address detection periodicity can be reduced, address detection can be completed in short time, and timeliness of IP duplicate address detection can be improved. In addition, when at least one of the binding table and the neighbor cache is abnormal, the binding table can be updated based on the neighbor cache, so that accuracy of IP duplicate address detection is improved.

In an embodiment, the method further includes: when the second IP address exists in the second information table, determining whether a state of an entry corresponding to the second IP address in the first information table is the reachable state.

In the solution provided in this application, when determining that an IP address that is the same as a detected IP address exists in the binding table, the first apparatus determines, depending on whether a state of an entry corresponding to the address that is the same as the to-be-detected IP address in the neighbor cache is a reachable state, whether the to-be-detected IP address is available.

In an embodiment, the method further includes: when the state of the entry corresponding to the second IP address in the first information table is the reachable state, sending an address detection response message to the first device, where the address detection response message indicates that the first IP address is unavailable.

In the solution provided in this application, when determining that the address that is the same as the to-be-detected IP address exists in the binding table, and the state of the entry corresponding to the address that is the same as the to-be-detected IP address in the neighbor cache is the reachable state, the first apparatus determines that the to-be-detected IP address is unavailable, and sends an address detection response message to a device that sends the to-be-detected IP address, to indicate to the device that the IP address is unavailable.

In an embodiment, the method further includes: when the state of the entry corresponding to the second IP address in the first information table is an unreachable state, determining that the first IP address is available.

In the solution provided in this application, when determining that the address that is the same as the to-be-detected IP address exists in the binding table, and the state of the entry corresponding to the address that is the same as the to-be-detected IP address in the neighbor cache is an unreachable state, the first apparatus determines that the to-be-detected IP address is available, and does not need to send the address detection response message to the first device. If the first device does not receive the response message within predetermined time, the first device automatically considers by default that a to-be-detected IP address is available, and may subsequently use the IP address to perform service transmission.

According to a second aspect, this application provides an address detection method. The method may be applied to a second device, or may be applied to a module (for example, a chip) in the second device. The following uses an example in which the method is applied to the second device for description. The method may include: receiving a third NS message from a first apparatus, where a target address of the third NS message is a first IP address, and the first IP address is a to-be-detected IP address of a first device; and when a second IP address is the same as the first IP address, sending a third NA message to the first apparatus, where the third NA message includes the second IP address and a second media access control address, and the second IP address is an IP address of the second device.

In the solution provided in this application, the to-be-detected IP address of the first device is the first IP address, the IP address of the second device is the second IP address, and the first IP address is the same as the second IP address. When a binding table exists and a neighbor cache does not exist or a state of an entry in the neighbor cache is an unreachable state, because a first information table stores an IP address of a device that is at a MAC layer of a same network with the first apparatus, when determining the first information table, the first apparatus may determine which devices of all devices on a same link with the first apparatus are devices that are at the MAC layer of the same network with the first apparatus. When receiving the first IP address of the first device, the first apparatus sends, to all the devices on the same link with the first apparatus, a solicitation message used to solicit IP addresses of the devices that are at the MAC layer of the same network with the first apparatus. Because the second device is a device that is at the MAC layer of the same network with the first apparatus, after receiving the solicitation message from the first apparatus, the second device may send a response message including the second IP address and the second MAC address to the first apparatus, so that the first apparatus may determine the neighbor cache based on the second IP address, so as to determine the binding table based on the neighbor cache. When the first device initiates IP address detection, whether a to-be-detected IP address is truly duplicate may be detected based on the binding table and the neighbor cache, thereby improving accuracy of duplicate address detection.

In an embodiment, the method further includes: sending a first NS message to the first apparatus, where the first NS message includes a second IP address and the second media access control address.

In the solution provided in this application, when the neighbor cache exists and the binding table does not exist, when sending service data to the first apparatus, the second device needs to first obtain a MAC address of the first apparatus, that is, send, to the first apparatus, a solicitation message used to solicit the MAC address of the first apparatus. In an embodiment, the second device may send an NS message including the second IP address to the first apparatus, so that the first apparatus determines that the second device is a device that is at the MAC layer of the same network with the first apparatus, and updates and stores the received second IP address into the neighbor cache. In an embodiment, if the second IP address does not exist in the neighbor cache, the second IP address is stored in an entry in the neighbor cache, and a state of the entry is a reachable state. Alternatively, if the second IP address already exists in the neighbor cache, a state of an entry corresponding to the second IP address is changed to a reachable state. In this way, the first apparatus may determine the neighbor cache, so as to determine the binding table based on the neighbor cache. When a device initiates IP address detection, whether a to-be-detected IP address is truly duplicate may be detected based on the binding table and the neighbor cache, thereby improving accuracy of duplicate address detection.

In an embodiment, the method further includes: receiving a second NS message from the first apparatus; and sending a second NA message to the first apparatus, where the second NA message includes a second IP address and the second media access control address.

In the solution provided in this application, when the neighbor cache exists and the binding table does not exist, when sending service data to the second device, the first apparatus needs to first obtain a MAC address of the second device, that is, send, to the second device, a solicitation message used to solicit the MAC address of the second device. In an embodiment, the first apparatus may send an NS message to the second device and receive an NA message that is from the second device and that includes the second IP address, so that the first apparatus determines that the second device is a device that is at the MAC layer of the same network with the first apparatus, and updates and stores the received second IP address into the neighbor cache. In an embodiment, if the second IP address does not exist in the neighbor cache, the second IP address is stored in an entry in the neighbor cache, and a state of the entry is a reachable state. Alternatively, if the second IP address already exists in the neighbor cache, a state of an entry corresponding to the second IP address is changed to a reachable state. In this way, the first apparatus may determine the neighbor cache, so as to determine the binding table based on the neighbor cache. When a device initiates IP address detection, whether a to-be-detected IP address is truly duplicate may be detected based on the binding table and the neighbor cache, thereby improving accuracy of duplicate address detection.

According to a third aspect, this application provides an address detection method. The method may be applied to a first apparatus, or may be applied to a module (for example, a chip) in the first apparatus. The following uses an example in which the method is applied to the first apparatus for description. The method may include:

determining a first information table, where the first information table includes an IP address of one or more devices, and the one or more devices and the first apparatus are at a MAC layer of a same network; and determining a second information table based on the first information table.

When both a binding table and a neighbor cache table exist, the first apparatus may update the binding table based on the neighbor cache, so that when a device initiates IP address detection, whether a to-be-detected IP address is duplicate may be detected based on the neighbor cache and the binding table updated based on the neighbor cache, thereby improving accuracy of duplicate address detection.

It may be understood that content of the third aspect corresponds to the content of the first aspect. For corresponding features of the third aspect and beneficial effects achieved by the third aspect, refer to the descriptions of the first aspect. To avoid repetition, detailed descriptions are appropriately omitted herein.

According to a fourth aspect, an embodiment of this application provides a communication apparatus.

For beneficial effects, refer to the descriptions of the first aspect. Details are not described herein again. The communication apparatus has a function of implementing the behavior in the method instance in the first aspect. The function may be implemented by hardware, or may be implemented by hardware executing corresponding software. The hardware or the software includes one or more modules corresponding to the foregoing function.

In an embodiment, the communication apparatus includes:

a receiving unit, configured to receive a first IP address from a first device, where the first IP address is a to-be-detected IP address of the first device;

a determining unit, configured to determine a first information table, where the first information table includes an IP address of one or more devices, and the one or more devices and a first apparatus are at a media access control MAC layer of a same network, where the determining unit is further configured to determine a second information table based on the first information table; and a detection unit, configured to detect whether a second IP address that is the same as the first IP address exists in the second information table, where a first media access control address corresponding to the first IP address is different from a second media access control address corresponding to the second IP address.

In an embodiment, when determining the second information table based on the first information table, the determining unit is configured to:

update the second information table based on the first information table.

In an embodiment, when determining the second information table based on the first information table, the determining unit is configured to:

create the second information table, where the created second information table includes the IP address of the one or more devices in the first information table.

In an embodiment, when determining the first information table, the determining unit is configured to:

receive a first NS message from a second device, where the first NS message includes a second IP address and the second media access control address, and the second IP address is an IP address of the second device; and store the second IP address and the second media access control address into a first entry in the first information table, where a state of the first entry is a reachable state.

In an embodiment, when determining the first information table, the determining unit is configured to:

send a second NS message to a second device;

receive a second NA message from the second device, where the second NA message includes a second IP address and the second media access control address, and the second IP address is an IP address of the second device; and store the second IP address and the second media access control address into a first entry in the first information table, where a state of the first entry is a reachable state.

In an embodiment, when determining the first information table, the determining unit is configured to:

send a third NS message to a plurality of devices based on the first IP address of the first device, where a target address of the third NS message is the first IP address, the plurality of devices belong to a same link, and the plurality of devices include a second device;

receive a third NA message from the second device, where the third NA message includes a second IP address and the second media access control address, the second IP address is an IP address of the second device, and the second IP address is the same as the first IP address; and determine the first information table based on the second IP address and the second media access control address.

In an embodiment, when determining the first information table based on the second IP address and the second media access control address, the determining unit is configured to:

create the first information table when the first information table does not exist, where the first information table includes the second IP address and the second media access control address, and a state of the first information table is a reachable state.

In an embodiment, when determining the first information table based on the second IP address and the second media access control address, the determining unit is configured to:

when a state of a first entry in the first information table is an unreachable state, change the state of the first entry to a reachable state, where the first entry includes the second IP address and the second media access control address.

In an embodiment, when sending the third NS message to the plurality of devices based on the first IP address of the first device, the determining unit is configured to:

when an address detection solicitation is received from the first device, send the third NS message to the plurality of devices, where the address detection solicitation includes the first IP address.

In an embodiment, the determining unit is further configured to:

when the second IP address exists in the second information table, determine whether a state of an entry corresponding to the second IP address in the first information table is the reachable state.

In an embodiment, the apparatus further includes:

a sending unit, configured to: when the state of the entry corresponding to the second IP address in the first information table is the reachable state, send an address detection response message to the first device, where the address detection response message indicates that the first IP address is unavailable.

According to a fifth aspect, an embodiment of this application provides a communication apparatus.

For beneficial effects, refer to the descriptions of the second aspect. Details are not described herein again. The communication apparatus has a function of implementing the behavior in the method instance in the second aspect. The function may be implemented by hardware, or may be implemented by hardware executing corresponding software. The hardware or the software includes one or more modules corresponding to the foregoing function.

In an embodiment, the communication apparatus includes:

a receiving unit, configured to receive a third NS message from a first apparatus, where a target address of the third NS message is a first IP address, and the first IP address is a to-be-detected IP address of a first device; and a sending unit, configured to: when a second IP address is the same as the first IP address, send a third neighbor advertisement NA message to the first apparatus, where the third NA message includes the second IP address and a second media access control address, and the second IP address is an IP address of a second device.

In an embodiment, the sending unit is further configured to:

send a first NS message to the first apparatus, where the first NS message includes a second IP address and the second media access control address.

In an embodiment, the receiving unit is further configured to:

receive a second NS message from the first apparatus.

The sending unit is further configured to:

send a second NA message to the first apparatus, where the second NA message includes a second IP address and the second media access control address.

According to a sixth aspect, a communication apparatus is provided. The communication apparatus may be a first apparatus, or may be a module (for example, a chip) in the first apparatus. The apparatus may include a processor, a memory, an input interface, and an output interface. The input interface is configured to receive information from another communication apparatus other than the communication apparatus. The output interface is configured to output information to a communication apparatus other than the communication apparatus. The processor invokes a computer program stored in the memory, to perform the address detection method according to any one of the first aspect or the implementations of the first aspect.

According to a seventh aspect, a communication apparatus is provided. The communication apparatus may be a second device, or may be a module (for example, a chip) in the second device. The apparatus may include a processor, a memory, an input interface, and an output interface. The input interface is configured to receive information from another communication apparatus other than the communication apparatus. The output interface is configured to output information to a communication apparatus other than the communication apparatus. The processor invokes a computer program stored in the memory, to perform the address detection method according to any one of the second aspect or the implementations of the second aspect.

According to an eighth aspect, this application provides a communication system. The communication system includes at least one first device, at least one second device, and at least one first apparatus. When being run in the communication system, the at least one first device, the at least one second device, and the at least one first apparatus are configured to perform any address detection method according to the first aspect or the second aspect.

According to a ninth aspect, this application provides a computer-readable storage medium. The computer-readable storage medium stores a computer program or computer instructions. When the computer program or the computer instructions are run, the method in any one of the first aspect and the possible implementations of the first aspect or in any one of the second aspect and the possible implementations of the second aspect is performed.

According to a tenth aspect, this application provides a computer program product including executable instructions. When the computer program product is run on a user equipment, the method in any one of the first aspect or the possible implementations of the first aspect or in any one of the second aspect or the possible implementations of the second aspect is performed.

According to an eleventh aspect, this application provides a chip system. The chip system includes a processor, may further include a memory, and is configured to implement the method according to the first aspect and any possible implementation of the first aspect, or the second aspect and any possible implementation of the second aspect. The chip system may include a chip, or may include a chip and another discrete component.

BRIEF DESCRIPTION OF DRAWINGS

To describe technical solutions in embodiments of this application more clearly, the following briefly describes the accompanying drawings for describing embodiments.

DESCRIPTION OF EMBODIMENTS

The following describes embodiments of this application in detail with reference to the accompanying drawings in embodiments of this application.

Terms used in an implementation part of this application are used to only explain embodiments of this application, but are not intended to limit this application.

The following first provides definitions of technical terms that may occur in embodiments of this application.

(1) Duplicate Address Detection (DAD)

Figure 1:
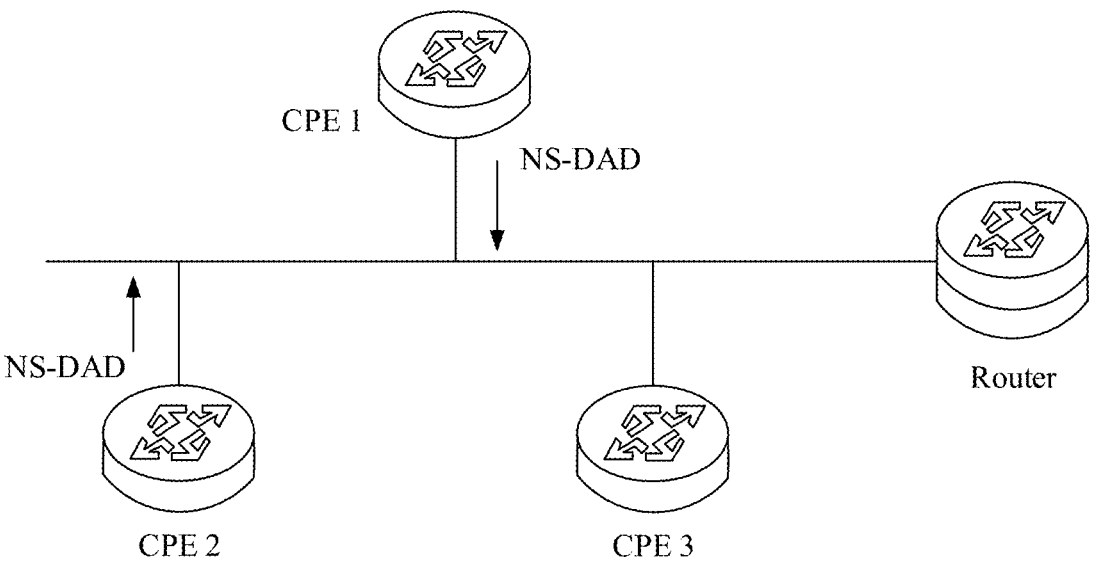
FIG. 1 is a diagram of a DAD mechanism in an ND protocol.

Before any IPv6 address of an interface of an IPv6 node takes effect, the IPv6 node needs to detect and determine, by using a DAD process in a neighbor discovery (ND) protocol, whether the address is duplicate on a same link (link). FIG. 1 is a diagram of a DAD mechanism in an ND protocol. As shown in FIG. 1, a link may include a customer premise equipment (CPE) 1, a CPE 2, a CPE 3, and a router. Before any interface attempts to use any IPv6 address, the CPE 1 first sends an address detection message to each of the CPE 2 and the CPE 3 on the same link. If the CPE 2 uses a same IPv6 address, that is, a destination address in the address detection message from the CPE 1 is the same as the IPv6 address of the CPE 2, namely, the address of the CPE 2 is duplicate with the address of the CPE 1, the CPE 2 sends a response message to the CPE 1. The CPE 1 receives the response message from the CPE 2, and determines that the IPv6 address is about to be unavailable. The CPE 1 may autonomously configure a new IPv6 address or the new IPv6 address is configured by a user, and the CPE 1 re-executes the DAD process. When the CPE 1 does not (or no longer) receive a response message fed back by another node on the same link, the CPE 1 determines that the IPv6 address is available.

(2) DAD Proxy

Figure 2:
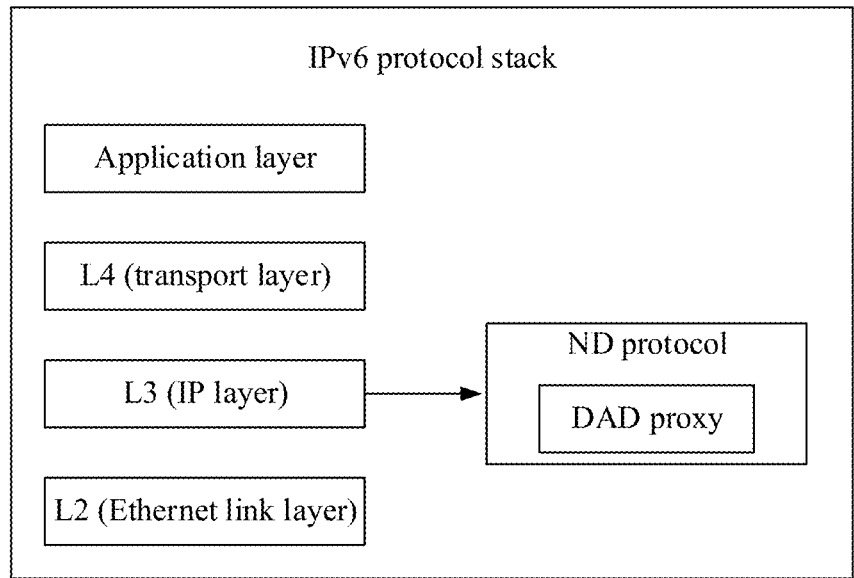
FIG. 2 is a diagram of a structure of an IPv6 protocol stack according to an embodiment of this application.

FIG. 2 is a diagram of a structure of an IPv6 protocol stack according to an embodiment of this application. As shown in FIG. 2, the IPv6 protocol stack may include an application layer, a transport layer, an IP layer, and an Ethernet link layer. The transport layer may also be referred to as a layer 4 (L4), the IP layer may also be referred to as a layer 3 (L3), and the Ethernet link layer may also be referred to as a layer 2 (L2). The Ethernet link layer may also be referred to as a media access control layer, which is referred to as a MAC layer for short. The DAD proxy may be a functional module at the L3 in the IPv6 protocol stack.

Figure 3:
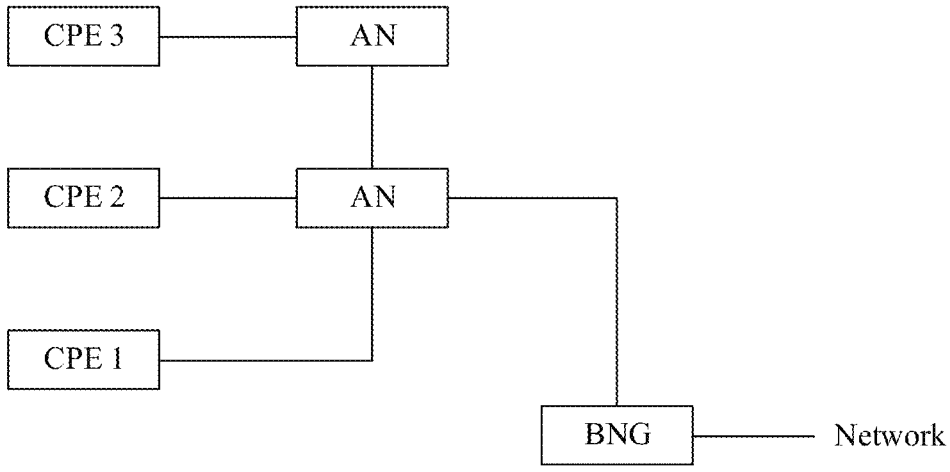
FIG. 3 is a schematic of a model of split horizon networking.

In an access network architecture defined by a broadband forum (broadband forum, BBF), due to an impact of split horizon, user equipments on different lines cannot communicate with each other because of a requirement of information isolation. Therefore, when a plurality of user lines are added to a same link, the same link may also be understood as a same virtual local area network (VLAN), a user CPE (or a user host) serving as an IPv6 node cannot receive an address detection message sent by an IPv6 node on another line, or cannot feed back a response message after detecting an IPv6 address duplicate, the DAD mechanism in the ND protocol fails. FIG. 3 is a schematic of a model of split horizon networking. A CPE is a terminal access device, an access node (AN) is an L2 device, and a broadband network gateway (BNG) is a first-hop router device. The BNG is connected to a network. In the split horizon networking, a CPE 1, a CPE 2, and a CPE 3 cannot communicate with each other through the AN. All messages are received and sent through the BNG. In the split horizon networking, a plurality of CPEs cannot perform L2 interconnection and cannot directly exchange messages. Therefore, an address duplicate cannot be detected by using the DAD mechanism. Therefore, in this networking scenario, a DAD proxy is established on the BNG, and the DAD proxy helps complete a DAD process needed by IPv6 nodes on different user lines on a same link.

(3) Binding Table

As shown in FIG. 3, the BNG may not only support the DAD proxy, but also establish and maintain a binding table of a proxied user equipment. There are a plurality of entries in the binding table. Each entry stores an IP address of a CPE and a MAC address corresponding to the IP address. For example, the CPE 1 sends an address detection solicitation to the BNG. The address detection solicitation carries a to-be-detected IP address (for example, a first IP address) of the CPE 1 and a MAC address (for example, MAC1) of the CPE 1. In this case, the BNG may create an entry in the binding table, and store the first IP address and the MAC1 into the entry.

(4) Neighbor Cache

As shown in FIG. 3, the BNG may not only support the DAD proxy, but also establish and maintain the neighbor cache of the proxied user equipment. There are a plurality of entries in the neighbor cache. Each entry stores an IP address and a MAC address of a user equipment that is at a MAC layer of a same network with the BNG. For example, the CPE 2 is a device that is at the MAC layer of the same network with the BNG. An entry in the neighbor cache stores an IP address (for example, a second IP address) and a MAC address (for example, MAC2) that are of the CPE 2, and a state of the entry is a reachable state. It should be noted that the neighbor cache in embodiments of this application may also be understood as an address resolution protocol (ARP) entry of internet protocol version 4 (IPv4) networking.

(5) State of an IPv6 Address

The state of the IPv6 address is classified as an initial state (tentative), a duplicate state (duplicate), or an available state (OK).

Initial state: When a device obtains an IPv6 address, a state of the IPv6 address is the initial state. The device may send the IPv6 address to the BNG to solicitation the BNG to detect the IPv6 address.

Duplicate state: The BNG performs address detection on the IPv6 address in the initial state that is sent by the device. If the BNG detects that the IPv6 address is unavailable, the BNG may send a response message indicating that the IPv6 address is unavailable to the device, and the device changes the state of the IPv6 address from the initial state to the duplicate state.

Available state: The BNG performs address detection on the IPv6 address in the initial state that is sent by the device. If the BNG detects that the IPv6 address is available, the BNG may not send a response message to the device. If the device does not receive the response message from the BNG within preset time, the device changes the state of the IPv6 address from the initial state to the available state.

(6) State of an Entry in a Neighbor Cache

The state of the entry in the neighbor cache includes: an incomplete state (incomplete), a reachable state (reachable), a stale state (stale), a delay state (delay), and a probe state (probe).

Incomplete state: Address resolution is in progress, but a link-layer address of a neighbor is not determined. This indicates that a CPE has sent an NS message whose target address is an address of a node that is solicited for address detection, but has not received a corresponding NA message.

Reachable state: If the BNG receives a reachability acknowledgment for an associated ND cache entry within a time interval, the ND cache entry is in the reachable state. The acknowledgment may be that the CPE receives a neighbor advertisement after a neighbor solicitation, or an upper-layer protocol successfully uses the ND cache entry. The reachable state may last for 30s.

Stale state: After the time interval has expired, a subsequent reachability acknowledgment is received.

Delay state: Although the time interval has expired, an upper layer device still sends a data message to an address of a cache entry. After the defined time interval, a neighbor solicitation is sent and a state of the ND cache entry is changed to the probe state.

Probe state: The probe state occurs when the neighbor solicitation is sent (possibly resent) and ends when a response message is received.

(7) DAD Proxy Technology

Figure 4:
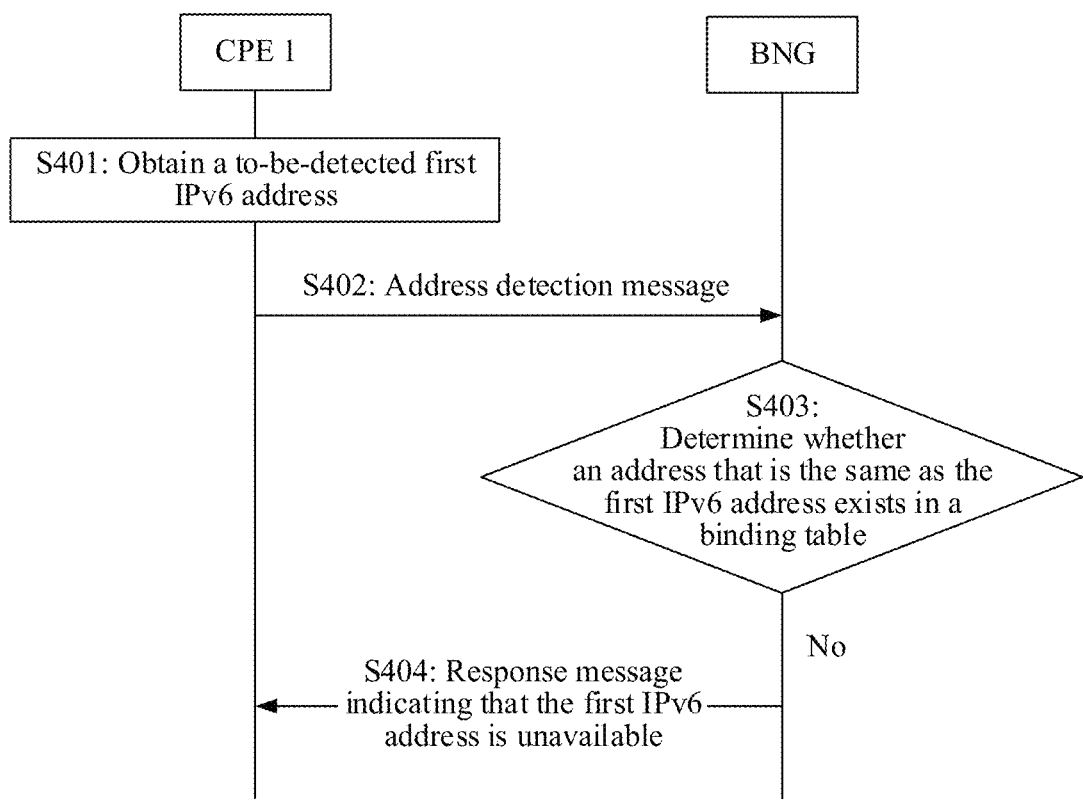
FIG. 4 is a schematic flowchart of a DAD method.

FIG. 4 is a schematic flowchart of a DAD method. As shown in FIG. 4, the DAD method includes the following operations.

Operation S401: A CPE 1 obtains a to-be-detected first IPv6 address.

The to-be-detected first IPv6 address may be configured by a user, automatically configured by a system for the CPE 1, or randomly generated by the CPE 1. The first IPv6 address is an IPv6 address available to the CPE 1.

For example, the first IPv6 address may be represented as 1::1.

Operation S402: The CPE 1 sends an address detection message to a BNG.

The address detection message carries the to-be-detected first IPv6 address. When the CPE 1 obtains the to-be-detected first IPv6 address, the CPE 1 performs DAD on the to-be-detected first IPv6 address. In an embodiment, the CPE 1 sends an NS message used for the DAD to the BNG. The NS message includes a source address of the NS message, a target address of the NS message, and MAC1 of the CPE 1. For example, the source address of the NS message may be represented as ::, and the target address of the NS message is the first IPv6 address.

Operation S403: The BNG determines whether an address that is the same as the first IPv6 address exists in a binding table.

The BNG may update the binding table by using the first IPv6 address 1::1 and a MAC address MAC1 corresponding to the first IPv6 address. That is, if the BNG finds no address that is the same as the first IPv6 address in the binding table, the BNG adds the first IPv6 address and the MAC address MAC1 corresponding to the first IPv6 address to the binding table, determines that the CPE 1 can use the first IPv6 address, and no longer sends a response message to the CPE 1. If the BNG finds the address (for example, a second IPv6 address) that is the same as the first IPv6 address in the binding table, the BNG determines whether the MAC1 is the same as a MAC address bound to the second IPv6 address. If the MAC1 is the same as the MAC address bound to the second IPv6 address, the BNG determines that the CPE 1 can use the first IPv6 address. If the MAC1 is not the same as the MAC address bound to the second IPv6 address, the BNG determines whether a state of an entry corresponding to the first IPv6 address in a neighbor cache is a reachable state. If the state of the entry is an unreachable state, the BNG determines that the CPE 1 can use the first IPv6 address, and no longer sends the response message to the CPE 1. If the device does not receive the response message from the BNG within preset time, the device determines that the first IPv6 address is available. In an embodiment, the BNG sends, to the CPE 1, a response message indicating that the first IPv6 address is available. If the state of the entry is the reachable state, the BNG performs operation S404.

Operation S404: The BNG sends, to the CPE 1, a response message indicating that the first IPv6 address is unavailable.

The BNG determines that the CPE 1 cannot use the first IPv6 address, and sends the response message to the CPE 1. The response message indicates that the CPE 1 cannot use the first IPv6 address. In an embodiment, the BNG returns an NA message to the CPE 1. A source address in the NA message is 1::1, and a target address is 1::1.

In the foregoing method, the BNG records a to-be-detected IPv6 address of a device and a MAC address corresponding to the to-be-detected IPv6 address by using the binding table, records an IPv6 address in a reachable state by using the neighbor cache, and determines, based on the binding table and the neighbor cache, whether the to-be-detected IPv6 address is truly duplicate. Because the binding table and the neighbor cache are established on the BNG, and the BNG is responsible for detecting an NS message sent by a CPE on a same link and feeding back an NA message when an address duplicate exists, a DAD mechanism of each IPv6 node on the same link is effectively established.

However, when the binding table does not exist and the neighbor cache exists, when a device sends an IPv6 address detection solicitation, the BNG does not process the solicitation due to the lack of the binding table. As a result, address detection of the device is inaccurate, and communication is abnormal.

When the neighbor cache does not exist, the BNG creates a neighbor cache in a stale state and performs reachability detection. In an embodiment, if the BNG with an enabled DAD proxy has received an address detection solicitation of the CPE 1, but no CPE sends service data to the BNG, the neighbor cache cannot be obtained. When the neighbor cache does not exist, a new neighbor cache is needed. The neighbor cache stores the first IPv6 address and the MAC1 of the CPE 1, and a state of an entry corresponding to the first IPv6 address and the MAC1 is the stale state. Then, the state is switched in sequence: STALE→DELAY (where this state lasts for a period of time)→PROBE. For example, the period of time is 5 seconds (seconds, s), that is, the BNG can detect whether the address is duplicate after 5 s. A delay of the method is high, and communication efficiency is reduced. In addition, for example, in order to enable an IPv6 address to be used as soon as possible, a default address detection periodicity of most devices is actually 1 s. Because no response message is received within 1 s, the device considers by default that the IPv6 address is not duplicate and can be used. However, when an actual detection result of the IPv6 address is obtained, the IPv6 address has been determined to be available and valid. This method causes a service fault.

If the binding table does not exist and the neighbor cache does not exist, the BNG creates only the binding table without other processing. When a device sends an IPv6 address detection solicitation, address detection of the device is inaccurate due to the lack of the neighbor cache, resulting in abnormal communication.

Based on the foregoing descriptions, to better understand a duplicate address detection method provided in this application, the following first describes a system architecture to which embodiments of this application are applied.

The method shown in this application may be applied to a system architecture of IPv6 transmission networking. The method shown in this application may also be applied to a scenario in which a base station performs IPv6 backplane-based co-transmission. For example, a backplane performs transmission through a panel, and the panel supports the DAD proxy.

Figure 5:
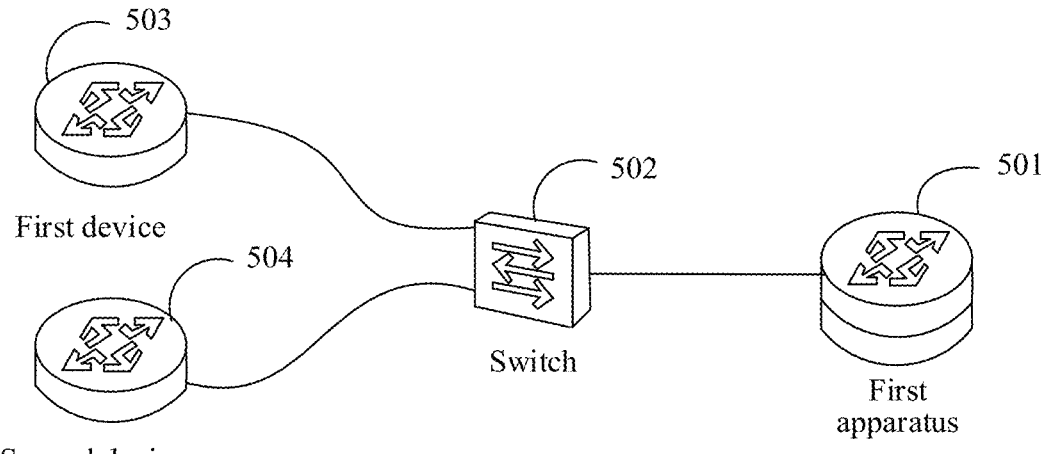
FIG. 5 is a diagram of a system architecture according to an embodiment of this application.

FIG. 5 is a diagram of a system architecture according to an embodiment of this application. As shown in FIG. 5, the system architecture may include a first apparatus 501, a switch 502, a first device 503, and a second device 504. The first device 503 and the second device 504 communicate with the first apparatus 501 through the switch 502. The first device 503 and the second device 504 implement L3 interconnection through the first apparatus 501. The first apparatus 501 supports a DAD proxy, and implements IPv6 duplicate address detection between the first device 503 and the second device 504.

The first apparatus 501 is a network element node that supports IPv6, has an IPv6 forwarding capability, supports the DAD proxy, and implements the IPv6 duplicate address detection between the first device 503 and the second device 504. The first apparatus 501 may be a broadband network gateway BNG, for example, a router, or may be another network element or network device having the IPv6 forwarding capability. A device type of the first apparatus 501 is not limited in this application.

The network device may be an entity configured to transmit or receive a signal, or may be a device configured to communicate with a terminal device, for example, may be a base station or a radio controller in a cloud radio access network (CRAN) scenario. Alternatively, the network device may be a relay station, an access point, a vehicle-mounted device, a wearable device, or the like. A type of the network device is not limited in embodiments of this application. The network device may be a device in a wireless network, for example, a radio access network (RAN) node that enables a terminal to access the wireless network. Currently, some examples of the RAN node are: a base station, a next-generation base station gNB, a transmission reception point (TRP), an evolved NodeB (evoeNB), a home base station, a baseband unit (BBU), an access point (AP) in a Wi-Fi system, or the like. In a network structure, the network device may include a central unit (CU) node, a distributed unit (DU) node, or a RAN device including the CU node and the DU node.

The first device 503 and the second device 504 in embodiments of this application may be devices that can perform communication by using IPv6 and that are configured to receive or transmit a signal, for example, may be CPEs, user equipments, access terminals, subscriber units, subscriber stations, mobile stations, remote stations, remote terminals, mobile devices, subscriber terminals, terminals, radio communication devices, user agents, or user apparatuses. The terminal may alternatively be a cellular phone, a cordless telephone, a session initiation protocol (SIP) phone, a wireless local loop (WLL) station, a personal digital assistant (PDA), a handheld device having a wireless communication function, a computing device, another processing device connected to a modem, a vehicle-mounted device, or a wearable device. This is not limited in embodiments of this application.

In an embodiment of the application, the first apparatus 501, the switch 502, the first device 503, and the second device 504 belong to a same link. The first device 503 may send an address detection solicitation to the first apparatus 501. The address detection solicitation includes a first IP address, and the first IP address is a to-be-detected IP address of the first device 503. After receiving the address detection solicitation from the first device 503, the first apparatus 501 may determine a first information table, then determine a second information table based on the first information table, and detect whether a second IP address that is the same as the first IP address exists in the second information table. A MAC address corresponding to the first IP address is different from a MAC address corresponding to the second IP address.

It should be noted that a quantity and types of devices included in the system architecture shown in FIG. 5 are merely an example, and embodiments of this application are not limited thereto. For example, more or fewer devices that communicate with the first apparatus may be further included. For brief description, the devices are not described in the accompanying drawings.

Figure 6:
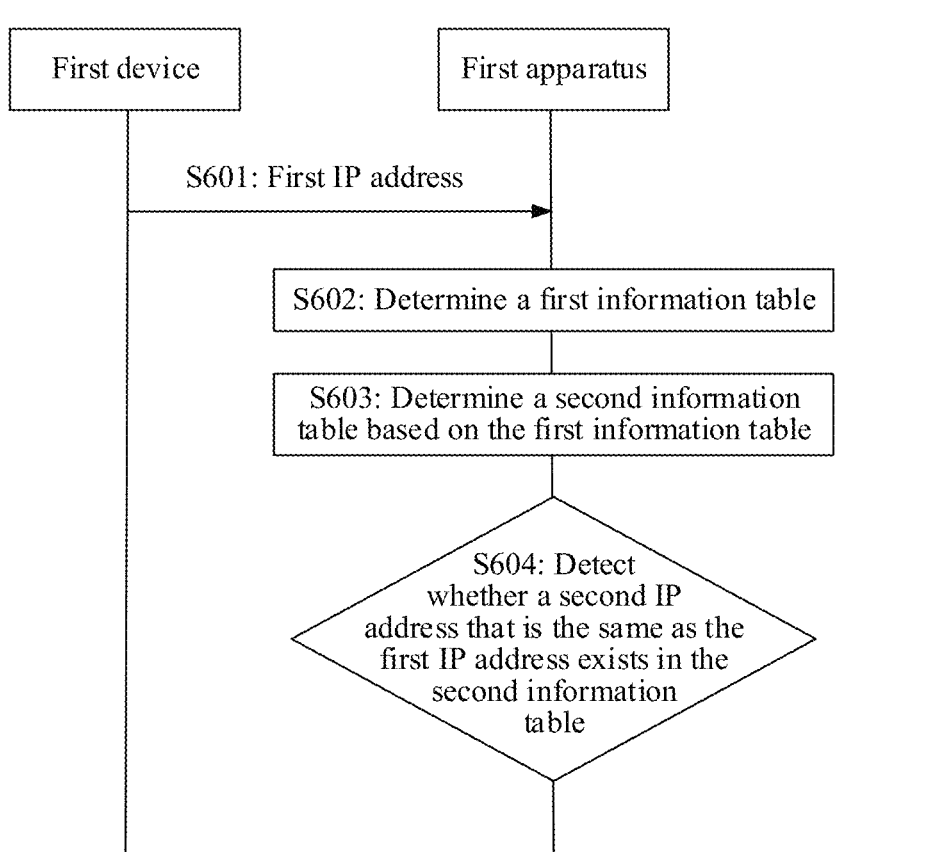
FIG. 6 is a schematic flowchart of an address detection method according to an embodiment of this application.

With reference to the foregoing system architecture, the following describes an address detection method provided in an embodiment of this application. FIG. 6 is a schematic flowchart of an address detection method according to an embodiment of this application. As shown in FIG. 6, the address detection method may include operation S601 to operation S604. It should be noted that an execution sequence of operation S601 to operation S604 is not limited in this application.

Operation S601: A first device sends a first IP address to a first apparatus.

Correspondingly, the first apparatus receives the first IP address from the first device.

The first device may send the first IP address to the first apparatus. In an embodiment, the first IP address may be an address used by the first apparatus for detection. For example, the first IP address is a to-be-detected IP address of the first device. In an embodiment, the first IP address may be an address included in an address detection solicitation. For example, the first device sends an address detection solicitation to the first apparatus. The address detection solicitation carries the first IP address.

Before the first device needs to use the first IP address, to ensure uniqueness of the IP address on a same link, the first device needs to detect, by using an address detection process in a neighbor discovery protocol, whether the IP address of the first device is available on the same link. The to-be-detected IP address may be configured by a user, may be automatically configured by a system for the first device, or may be randomly generated by the first device.

In an embodiment, the first device may send an NS message used for the address detection solicitation to the first apparatus. The NS message includes a source address, a target address, and a destination address. The target address is the to-be-detected first IP address. In an embodiment of the application, the IP address may be an IPv6 address. A type of the IP address is not limited in embodiments of this application.

Operation S602: The first apparatus determines a first information table.

The first information table is used to store an IP address of a device that is at a MAC layer of a same network with the first apparatus. For example, the first information table may be a neighbor cache. There are a plurality of entries in the neighbor cache. Each entry stores an IP address and a MAC address of each device that is at the MAC layer of the same network with the first apparatus. For example, the first device and the first apparatus are at the MAC layer of the same network. An entry in the neighbor cache stores an IP address (for example, the first IP address) and a MAC address (for example, MAC1) that are of the first device, and a state of the entry is a reachable state.

The first apparatus determines the first information table. In an embodiment, when a device that uses an IP address and the first apparatus are at the MAC layer of the same network, the first apparatus may store both the IP address and a MAC address of the device into an entry of the first information table, and a state of the entry is the reachable state. Because the first information table stores the IP address of the device that is at the MAC layer of the same network with the first apparatus, it is assumed that a second device is a device that is at the MAC layer of the same network with the first apparatus, the first information table may be determined based on the second device. This is not repeated in the following.

In a first possible implementation, before the first apparatus determines the first information table, when sending service data to the first apparatus, the second device needs to first obtain a MAC address of the first apparatus, that is, send, to the first apparatus, a solicitation message used to solicit the MAC address of the first apparatus. In an embodiment, the second device may send a first NS message to the first apparatus. The first NS message is used to solicitation the MAC address of the first apparatus. The first NS message carries a second IP address and a second MAC address. The second IP address is an IP address of the second device, and the second MAC address is a MAC address corresponding to the second IP address, or may be understood as a MAC address of the second device. After receiving the first NS message, the first apparatus determines that the second IP address is available. When the first information table does not exist, a new first information table in an incomplete state may be created. Both the second IP address and the second MAC address are stored in the newly created first information table, and the state of the first information table is changed from the incomplete state to the reachable state. An implementation may be as follows: The first information table includes a first entry, both the second IP address and the second MAC address are stored in the first entry in the newly created first information table, and a state of the first entry is the reachable state. When the first information table exists, but the second IP address is not stored in the first information table, both the second IP address and the second MAC address may be automatically stored in the first entry in the first information table, and the state of the first entry is the reachable state. When the first information table exists and the second IP address is stored in the first information table, a state of an entry corresponding to the second IP address in the first information table is changed to the reachable state. When the first information table exists, the second IP address is stored in the first information table, and a state of an entry corresponding to the second IP address is the reachable state, the state of the entry corresponding to the second IP address in the first information table remains unchanged.

It should be noted that the first information table may include one or more entries, and each entry has a corresponding state, for example, the reachable state or an aging state. Each entry correspondingly stores an IP address and a MAC address that are of a device. Both the IP address and the MAC address are usually stored in a same entry.

In a second possible implementation, before the first apparatus determines the first information table, when sending service data to the second device, the first apparatus needs to first obtain a MAC address of the second device, that is, send, to the second device, a solicitation message used to solicit the MAC address of the second device. In an embodiment, the first apparatus may send a second NS message to the second device. The second NS message is used to solicit the MAC address of the second device. After receiving the second NS message, the second device sends a second NA message to the first apparatus. The second NA message carries a second IP address and a second MAC address. The second IP address is an IP address of the second device, and the second MAC address is a MAC address corresponding to the second IP address or may be understood as a MAC address of the second device. After receiving the second NA message, the first apparatus determines that the second IP address is available. When the first information table does not exist, a new first information table in an incomplete state may be created. Both the second IP address and the second MAC address are stored in the newly created first information table, and the state of the first information table is changed from the incomplete state to the reachable state. An implementation may be as follows: The first information table includes a first entry, both the second IP address and the second MAC address are stored in the first entry in the newly created first information table, and a state of the first entry is the reachable state. When the first information table exists, but the second IP address is not stored in the first information table, both the second IP address and the second MAC address may be automatically stored in the first entry in the first information table, and the state of the first entry is the reachable state. When the first information table exists and the second IP address is stored in the first information table, a state of an entry corresponding to the second IP address in the first information table is changed to the reachable state. When the first information table exists, the second IP address is stored in the first information table, and a state of an entry corresponding to the second IP address is the reachable state, the state of the entry corresponding to the second IP address in the first information table remains unchanged.

In a third possible implementation, before the first apparatus determines the first information table, when receiving the first IP address from the first device, the first apparatus may send, to all devices on a same link with the first apparatus, a solicitation message used to solicit an IP address of a device that is at the MAC layer of the same network with the first apparatus. The sending described herein may be understood as multicasting. For example, when receiving the first IP address from the first device, the first apparatus may multicast a third NS message to a plurality of devices. The third NS message is used to solicit the IP address of the device that is at the MAC layer of the same network with the first apparatus. A target address of the third NS message is the first IP address, and this may indicate that a device corresponding to an IP address that is the same as the first IP address may receive the third NS message. The plurality of devices include the first device and the second device, and the plurality of devices and the first apparatus belong to the same link. When a second IP address is the same as the first IP address, the second device receives the third NS message, and then sends a third NA message to the first apparatus. The third NA message carries the second IP address and a second MAC address. The second IP address is an IP address of the second device, and the second MAC address is a MAC address corresponding to the second IP address or may be understood as a MAC address of the second device. After receiving the third NA message, the first apparatus determines that the second IP address is available. When the first information table does not exist, a new first information table in an incomplete state may be created. Both the second IP address and the second MAC address are stored in the newly created first information table, and the state of the first information table is changed from the incomplete state to the reachable state. An implementation may be as follows: The first information table includes a first entry, both the second IP address and the second MAC address are stored in the first entry in the newly created first information table, and a state of the first entry is the reachable state. When the first information table exists, but the second IP address is not stored in the first information table, both the second IP address and the second MAC address may be automatically stored in the first entry in the first information table, and the state of the first entry is stored as the reachable state. When the first information table exists and the second IP address is stored in the first information table, a state of an entry corresponding to the second IP address in the first information table is changed to the reachable state. When the first information table exists, the second IP address is stored in the first information table, and a state of an entry corresponding to the second IP address is the reachable state, the state of the entry corresponding to the second IP address in the first information table remains unchanged.

The first apparatus and the plurality of devices belong to the same link, the plurality of devices need to communicate with each other through the first apparatus, and the first device and the second device are any two of the plurality of devices. Relationships between the first apparatus, the first device, the second device, and the plurality of devices are uniformly described herein, and details are not described subsequently.

Operation S603: The first apparatus determines a second information table based on the first information table.

The second information table is used to store an IP address of a device that solicits address detection. For example, the second information table is a binding table. There are a plurality of entries in the binding table. Each entry stores an IP address of a device for DAD detection and a MAC address corresponding to the IP address. The first device may send the first IP address and the MAC address of the first device to the first apparatus. For example, the first device sends an address detection solicitation to the first apparatus. The address detection solicitation carries a to-be-detected IP address (for example, the first IP address) of the first device and a MAC address (for example, the MAC1) of the first device. The first apparatus may create an entry in the binding table, and store the to-be-detected first IP address and the MAC1 into the entry.

That the first apparatus may determine the second information table based on the first information table may be understood as that the first apparatus updates the second information table based on the first information table. In an embodiment, the first apparatus may first determine the first information table, and then determine the second information table.

After determining the first information table, the first apparatus may determine the second information table based on the first information table.

In an embodiment, when the second information table does not exist, the first apparatus may create a new second information table, and automatically and synchronously store an entry corresponding to a newly added or updated IP address in the first information table into the second information table. When the second information table exists, an entry corresponding to a newly added or updated IP address in the first information table is automatically and synchronously updated to the second information table. It may be understood that address detection needs to be performed before service transmission is performed between a device and the first apparatus. Therefore, the second information table may be determined based on the first information table.

Operation S604: The first apparatus detects whether a second IP address that is the same as the first IP address exists in the second information table.

After receiving the first IP address from the first device, the first apparatus may detect the first IP address based on the binding table and the neighbor cache. In an embodiment, the first apparatus determines whether the second IP address exists in the second information table. The second IP address is the same as the first IP address, and a second MAC address corresponding to the second IP address is different from a first MAC address corresponding to the first IP address.

In an embodiment, if the second IP address that is the same as the first IP address exists in the second information table, and the first MAC address is different from the second MAC address, it is further determined whether a state of an entry corresponding to the second IP address in the first information table is the reachable state. If the state of the entry corresponding to the second IP address in the first information table is the reachable state, the first apparatus may determine that the first device cannot use the first IP address. If the state of the entry corresponding to the second IP address in the first information table is an unreachable state, it may be determined that the first IP address is available.

In an embodiment, if the second IP address that is the same as the first IP address exists in the second information table, and the first MAC address is the same as the second MAC address, the IP address and the MAC address that are of the first device are stored in the second information table, and it is determined that the first IP address is an IP address available to the first device.

In an embodiment, if the second IP address that is the same as the first IP address does not exist in the second information table, it may be determined that the first IP address is available.

When determining that the first device cannot use the first IP address, the first apparatus sends, to the first device, an address detection response message indicating that the first IP address is unavailable. When the first apparatus determines that the first device can use the first IP address, the first apparatus does not need to send the address detection response message to the first device. If the first device does not receive the response message within predetermined time, the first device automatically considers by default that a to-be-detected IP address is available, and may subsequently use the IP address to perform service transmission. In an embodiment, when the first apparatus determines that the first device can use the first IP address, the first apparatus may alternatively send, to the first device, an address detection response message, such as an acknowledge (ACK) message, indicating that the first IP address is available.

It should be noted that the address detection described in the foregoing operations may be understood as duplicate address detection (DAD). An address duplicate may be understood as that a to-be-detected address is the same as or duplicate with an existing address, and cannot be reused. This is uniformly described herein, and details are not described subsequently.

In the solution provided in an embodiment of the application, if at least one of the first information table and second information table is abnormal, when a device initiates IP address detection, the second information table may be updated based on the first information table, so that whether a to-be-detected IP address is duplicate may be detected based on the two tables, to improve accuracy of duplicate address detection.

Figure 7:
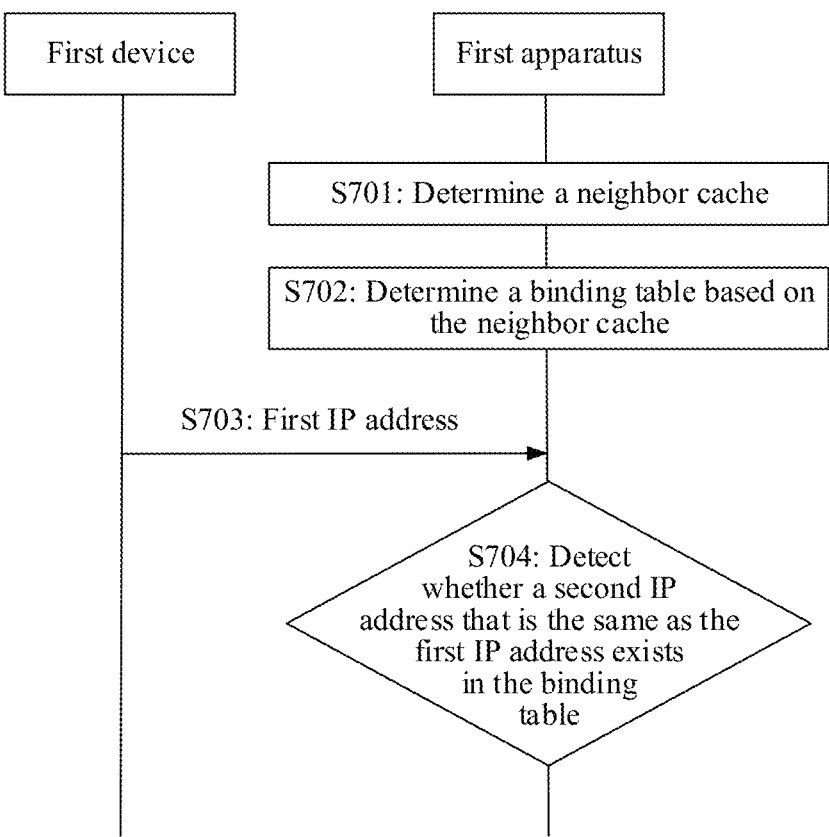
FIG. 7 is a schematic flowchart of an address detection method according to an embodiment of this application.

With reference to the embodiment in FIG. 6, the following describes an address detection method provided in an embodiment of this application. An embodiment may be applied to the first possible implementation in operation S602. In an embodiment, an example in which the first information table is the neighbor cache and the second information table is the binding table is used for description. The address detection method in an embodiment may be applied to a scenario in which the binding table does not exist and the neighbor cache exists. FIG. 7 is a schematic flowchart of an address detection method according to an embodiment of this application. As shown in FIG. 7, the address detection method may include operation S701 to operation S704.

Data of a first apparatus is lost due to factors such as restart of the first apparatus, for example, a binding table created and maintained by the first apparatus does not exist, and a neighbor cache still exists. In this case, the following operation S701 to operation S704 may be performed.

Operation S701: The first apparatus determines the neighbor cache.

It may be understood that, for operation S701, refer to the descriptions of the first possible implementation in which the first apparatus determines the first information table in operation S602. For descriptions of operation S701, refer to the descriptions of the first possible implementation in operation S602. To avoid repetition, details are not described herein again.

In an embodiment, in addition to including a second IP address and a second MAC address, a first NS message may further include a source address, a destination address, and a target address. For example, the source address is 1::1, the destination address is a multicast IP address that is of a solicited node and that is generated based on 1::1, and the target address is an interface IP address of the first apparatus.

After receiving the first NS message, the first apparatus determines that the second IP address is available. Because the data of the first apparatus is lost due to factors such as restart of the first apparatus, and the neighbor cache created and maintained by the first apparatus still exists, when the second IP address is not stored in the neighbor cache, the second IP address and the second MAC address may be stored in an entry (for example, a first entry) in the neighbor cache, and a state of the first entry is a reachable state. If the second IP address is stored in an entry in the neighbor cache, it is determined whether a MAC address in the entry is the second MAC address. If the MAC address is the second MAC address, a state of the entry is updated to the reachable state. If the MAC address is not the second MAC address, the MAC address in the entry is updated to the second MAC address, and the state of the entry is updated to the reachable state.

Operation S702: The first apparatus determines the binding table based on the neighbor cache.

It may be understood that, for operation S702, refer to the descriptions of operation S603. For descriptions of operation S702, refer to operation S603. To avoid repetition, details are not described herein again.

Because the data of the first apparatus is lost due to factors such as restart of the first apparatus, the binding table in the first apparatus does not exist. After determining the neighbor cache, the first apparatus may automatically and synchronously create a new binding table, and automatically store information corresponding to the entry in which the second IP address is stored and that is in the neighbor cache into the newly created binding table. For example, if the second IP address and the second MAC address are stored in the first entry in the neighbor cache, and the state of the entry is the reachable state, the second IP address and the second MAC address in the entry are automatically and synchronously updated to the binding table, that is, the second IP address and the second MAC address are stored in an entry in the binding table.

Operation S703: A first device sends a first IP address to the first apparatus.

It may be understood that, for descriptions of operation S703, refer to operation S601. To avoid repetition, details are not described herein again.

Operation S704: The first apparatus detects whether a second IP address that is the same as the first IP address exists in the binding table.

It may be understood that, for operation S704, refer to the descriptions of operation S604. For descriptions of operation S704, refer to operation S604. To avoid repetition, details are not described herein again.

When determining that the first device cannot use the first IP address, the first apparatus sends, to the first device, an address detection response message indicating that the first IP address is unavailable. In an embodiment, the first apparatus returns, to the first device, an NA message used for an address detection response. The NA message includes a source address, a destination address, and a to-be-detected target address. For example, the source address is 1::1, the destination address is a multicast IP address that is of a solicited node and that is generated based on 1::1, and the to-be-detected target address is 1::1. When the first apparatus determines that the first IP address is available, the first apparatus does not need to send the address detection response message to the first device. If the first device does not receive the response message within predetermined time, the first device automatically considers by default that a to-be-detected IP address is available, and may subsequently use the IP address to perform service transmission.

In an embodiment of the application, in a scenario in which the binding table does not exist and the neighbor cache exists due to factors such as restart of the first apparatus and a full specification of the binding table, in the solution provided in an embodiment of the application, after determining the neighbor cache, the first apparatus may create a new binding table, and automatically synchronize newly added or updated information in the neighbor cache to the binding table. When a device solicits address detection subsequently, whether an IP address is available may be detected based on the binding table and the neighbor cache. If the IP address is unavailable, an address detection response message indicating that the IP address is unavailable is returned. In an embodiment of the application, accuracy of duplicate address detection caused by a loss of the binding table in the scenario like the restart of the first apparatus or the full specification of the binding table can be improved.

Figure 8:
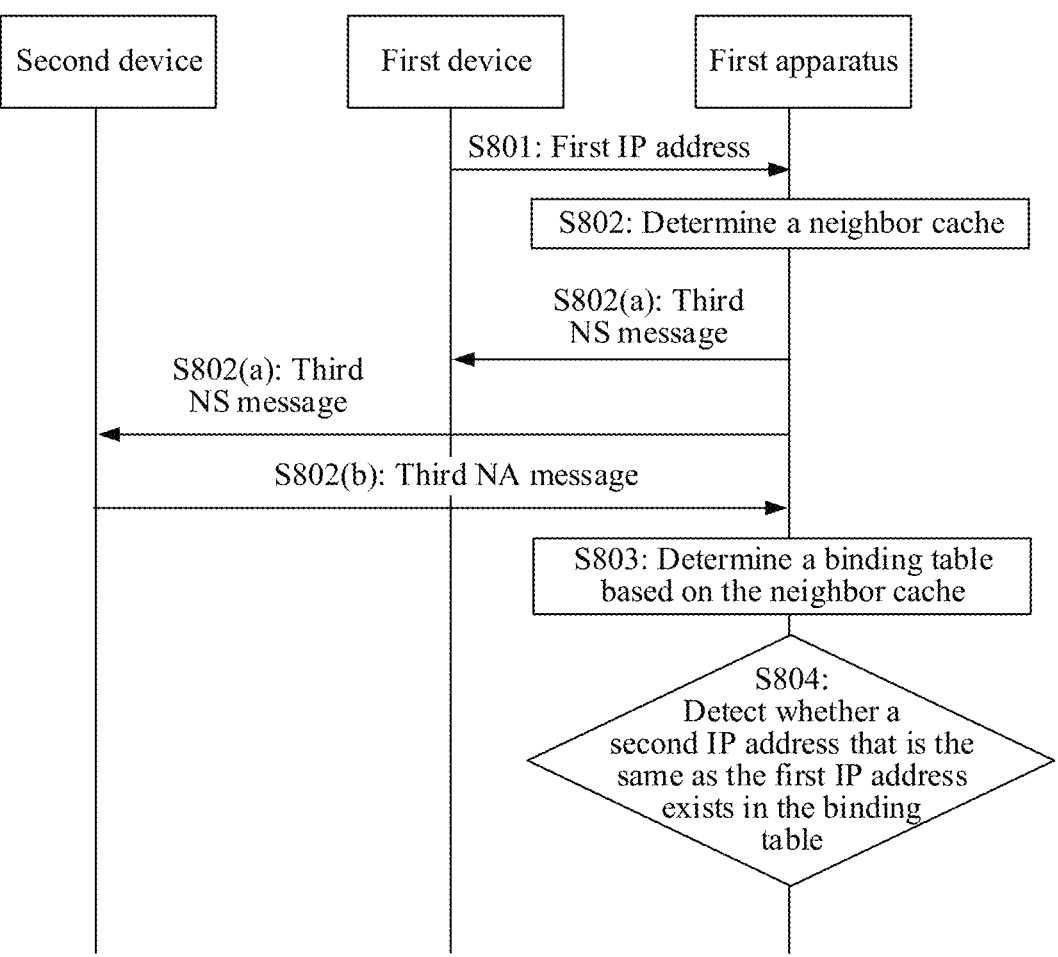
FIG. 8 is a schematic flowchart of an address detection method according to an embodiment of this application.

With reference to the embodiment in FIG. 6, the following describes an address detection method provided in an embodiment of this application. An embodiment may be applied to the second possible implementation and the third possible implementation in operation S602. In an embodiment, an example in which the first information table is the neighbor cache and the second information table is the binding table is used for description. The address detection method in an embodiment may be applied to a scenario in which the binding table exists and the neighbor cache does not exist or a state of an entry in the neighbor cache is an unreachable state. The address detection method in an embodiment may also be applied to a scenario in which the binding table does not exist and the neighbor cache does not exist or a state of an entry in the neighbor cache is an unreachable state. FIG. 8 is a schematic flowchart of an address detection method according to an embodiment of this application. As shown in FIG. 8, the address detection method may include operation S801 to operation S804.

Data of a first apparatus is lost due to factors such as restart of the first apparatus, for example, a binding table in the first apparatus still exists and a neighbor cache does not exist, or the binding table in the first apparatus still exists and a state of an entry in the neighbor cache is an unreachable state. In this case, the following operation S801 to operation S804 may be performed.

Data of a first apparatus is lost due to factors such as restart of the first apparatus, for example, a binding table in the first apparatus does not exist and a neighbor cache does not exist either, or the binding table in the first apparatus does not exist and a state of an entry in the neighbor cache is an unreachable state. In this case, the following operation S801 to operation S804 may also be performed.

Operation S801: A first device sends a first IP address to the first apparatus.

It may be understood that, for operation S801, refer to the descriptions of operation S601. To avoid repetition, details are not described herein again.

Operation S802: The first apparatus determines the neighbor cache.

In an embodiment, for descriptions of operation S802, refer to the descriptions of the second possible implementation and the third possible implementation in operation S602. To avoid repetition, details are not described herein again.

Operation S802(*a*): The first apparatus sends a third NS message to a plurality of devices (where a first device and a second device are used as an example in the figure). For example, the first apparatus multicasts the third NS message to the plurality of devices.

In an embodiment, the third NS message includes a source address, a destination address, and a to-be-detected target address. For example, the source address is an interface IP address of the first apparatus, the destination address is a multicast IP address that is of a solicited node and that is generated based on 1::1, and the to-be-detected target address is 1::1.

Because the target address of the third NS message is the first IP address, the first device may receive the third NS message. When a second IP address is the same as the first IP address, a second device may also receive the third NS message. Because detection of the first IP address is not completed in this case, the first device does not return a third NA message.

Operation S802(*b*): The second device sends a third NA message to the first apparatus. For example, if the second IP address is in a normal use state, the second device sends the third NA message to the first apparatus.

In an embodiment, the third NA message includes a source address, a destination address, a to-be-detected target address, and a second MAC address. For example, the source address is 1::1, the destination address is an interface IP address of the first apparatus, and the to-be-detected target address is 1::1. After receiving the third NA message from the second device, the first apparatus may store the second IP address and the second MAC address into an entry (for example, a first entry) in a newly created neighbor cache in an incomplete state, store a state of the entry as a reachable state, and change a state of the neighbor cache to the reachable state. Alternatively, after receiving the third NA message from the second device, the first apparatus may change a state of an entry corresponding to the second IP address in the neighbor cache to a reachable state.

In an embodiment, if the first apparatus does not receive the third NA message from any device, it may indicate that no other device uses an IP address that is the same as the first IP address. The first apparatus may store the first IP address and the first MAC address into an entry in the neighbor cache, and store a state of the entry as a reachable state. Alternatively, the first apparatus changes a state of an entry corresponding to the first IP address in the neighbor cache to a reachable state.

Operation S803: The first apparatus determines the binding table based on the neighbor cache.

For descriptions of operation S803, refer to the descriptions of operation S603. To avoid repetition, details are not described herein again.

In a case, because the binding table created and maintained by the first apparatus still exists, after determining the neighbor cache, the first apparatus automatically stores or updates information corresponding to an entry in which the second IP address is stored in the neighbor cache into the binding table.

In another case, because the binding table created and maintained by the first apparatus does not exist, the first apparatus may create a new binding table in a temporary state. After determining the neighbor cache, the first apparatus automatically stores or updates information corresponding to an entry in which the second IP address is stored in the neighbor cache into the binding table. Then, a state of the binding table is updated from the temporary state to an available state.

Operation S804: The first apparatus detects whether a second IP address that is the same as the first IP address exists in the binding table.

For descriptions of operation S804, refer to the descriptions of operation S604. To avoid repetition, details are not described herein again.

When determining that the first device cannot use the first IP address, the first apparatus sends, to the first device, an address detection response message indicating that the first IP address is unavailable. In an embodiment, the first apparatus returns, to the first device, an NA message used for an address detection response. The NA message used for the address detection response includes a source address, a destination address, and a to-be-detected target address. For example, the source address is 1::1, the destination address is a multicast IP address that is of a solicited node and that is generated based on 1::1, and the to-be-detected target address is 1::1. When the first apparatus determines that the first IP address is available, the first apparatus does not need to send the address detection response message to the first device. If the first device does not receive the response message within predetermined time, the first device automatically considers by default that a to-be-detected IP address is available, and may subsequently use the IP address to perform service transmission.

In an embodiment of the application, in a scenario in which due to factors such as restart of the first apparatus, the binding table exists and the neighbor cache does not exist or a state of an entry in the neighbor cache is an unreachable state, the first apparatus first determines the neighbor cache when receiving the first IP address of the first device. In an embodiment, the first apparatus may directly send, to all devices on a same link with the first apparatus, a solicitation message used to solicit an IP address of a device that is at a MAC layer of a same network with the first apparatus. After determining the neighbor cache, the first apparatus may automatically synchronize newly added or updated information in the neighbor cache to the binding table. When another device solicits address detection subsequently, whether an IP address of the another device is available may be detected based on the binding table and the neighbor cache. If the IP address is unavailable, an address detection response message indicating that the IP address is unavailable is returned. In a conventional technology, for example, after receiving the first IP address of the first device, the first apparatus needs 5 s to detect whether the IP address is available. Actually, a default address detection periodicity of most first apparatuses is 1 s. When an actual detection result of the IP address is obtained, the IP address has been determined as available and valid, causing a service fault. In an embodiment of the application, when receiving a to-be-detected IP address of a device, the first apparatus immediately sends, to all devices on a same link with the first apparatus, a solicitation message used to solicit an IP address of a device that is at a MAC layer of a same network with the first apparatus, to determine a neighbor cache, so as to subsequently perform address detection on the to-be-detected IP address based on the neighbor cache and a binding table. This can not only reduce an address detection periodicity and complete address detection within short time, but also improve accuracy of IP duplicate address detection.

In an embodiment of the application, in a scenario in which due to factors such as restart of the first apparatus, the binding table does not exist and the neighbor cache does not exist or a state of an entry in the neighbor cache is an unreachable state, the first apparatus first determines the neighbor cache when receiving the first IP address of the first device. In an embodiment, the first apparatus may directly send, to all devices on a same link with the first apparatus, a solicitation message used to solicit an IP address of a device at a MAC layer of a same network with the first apparatus. After determining the neighbor cache, the first apparatus may automatically synchronize newly added or updated information in the neighbor cache to the binding table. In addition, a state of the binding table is updated from a temporary state to an available state. When another device solicits address detection subsequently, whether an IP address of the another device is available may be detected based on the binding table and the neighbor cache. If the IP address is unavailable, an address detection response message indicating that the IP address is unavailable is returned. In the conventional technology, when the binding table does not exist and the neighbor cache does not exist, only the binding table is created, and no other processing is performed. When a device sends a to-be-detected IP address, address detection on the device is inaccurate due to the lack of the neighbor cache. Consequently, communication is abnormal. In the solution provided in this application, not only a new binding table is created, but also the first apparatus actively determines a neighbor cache, and then updates the binding table based on the neighbor cache. In this way, address detection performed based on the neighbor cache and binding table is more accurate.

It should be noted that in embodiments of the address detection method shown in FIG. 7 and FIG. 8, only the source address :: and the to-be-detected target address 1::1 are used as an example for description. The source address and the to-be-detected target address may alternatively be other addresses. Quantities of source addresses and to-be-detected target addresses are not limited in embodiments of this application. The first device and the second device may be devices that can use IPv6 for communication, for example, may be CPEs or terminal devices. The first apparatus may be a network element or a network device that has an IPv6 forwarding capability, for example, a BNG or a router.

In conclusion, the address detection method described in FIG. 6 may be refined into implementations in FIG. 7 and FIG. 8. The embodiment described in FIG. 7 may be applied to the scenario in which the binding table does not exist and the neighbor cache exists. The embodiment described in FIG. 8 may be applied to the scenario in which the binding table exists and the neighbor cache does not exist or the state the entry in the neighbor cache is the unreachable state, or may be applied to the scenario in which the binding table does not exist and the neighbor cache does not exist or the state of the entry in the neighbor cache is the unreachable state. It should be noted that the address detection method described in FIG. 6 may also be applied to the scenario in which the binding table exists and the neighbor cache exists (as described in FIG. 4), and the first apparatus detects a to-be-detected IP address of a device based on the binding table and the neighbor cache. In an embodiment of the application, the first apparatus detects the to-be-detected IP address of the device based on the binding table and the neighbor cache. In an embodiment, before determining whether an address that is the same as the first IP address exists in the binding table, the first apparatus may first determine the first information table, and then determine the second information table based on the first information table, so that a state of an entry of an existing IP address in the two tables may be refreshed, and the to-be-detected IP address of the device is detected based on the refreshed two tables, thereby improving accuracy of duplicate address detection.

In addition, for the first apparatus that implements the IP DAD proxy, in a scenario in which restart of the first apparatus is supported, DAD proxy is supported for a large quantity of first apparatuses at the same time, and there is no strict requirement for network configuration, implementing the solutions of this application can reduce security risks and reduce operation costs.

The following describes a communication apparatus embodiment in embodiments of this application.

Figure 9:
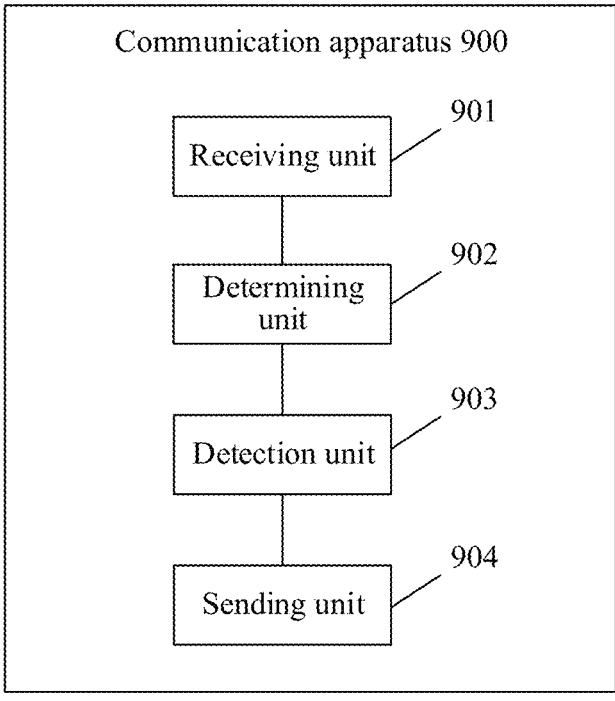
FIG. 9 is a diagram of a structure of a communication apparatus according to an embodiment of this application.

FIG. 9 is a diagram of a structure of a communication apparatus according to an embodiment of this application. The apparatus may be a first apparatus, or may be a module (for example, a chip) in the first apparatus. As shown in FIG. 9, the apparatus 900 includes at least a receiving unit 901, a determining unit 902, a detection unit 903, and a sending unit 904.

The receiving unit 901 is configured to receive a first IP address from a first device. The first IP address is a to-be-detected IP address of the first device.

The determining unit 902 is configured to determine a first information table. The first information table includes an IP address of one or more devices, and the one or more devices and the first apparatus are at a MAC layer of a same network.

The determining unit 902 is further configured to determine a second information table based on the first information table.

The detection unit 903 is configured to detect whether a second IP address that is the same as the first IP address exists in the second information table. A first media access control address corresponding to the first IP address is different from a second media access control address corresponding to the second IP address.

In an embodiment, when determining the second information table based on the first information table, the determining unit 902 is configured to:

update the second information table based on the first information table.

In an embodiment, when determining the second information table based on the first information table, the determining unit 902 is configured to:

create the second information table, where the created second information table includes the IP address of the one or more devices in the first information table.

In an embodiment, when determining the first information table, the determining unit 902 is configured to:

receive a first NS message from a second device, where the first NS message includes a second IP address and the second media access control address, and the second IP address is an IP address of the second device; and store the second IP address and the second media access control address into a first entry in the first information table, where a state of the first entry is a reachable state.

In an embodiment, when determining the first information table, the determining unit 902 is configured to:

send a second NS message to a second device;

receive a second NA message from the second device, where the second NA message includes a second IP address and the second media access control address, and the second IP address is an IP address of the second device; and store the second IP address and the second media access address into a first entry in the first information table, where a state of the first entry is a reachable state.

In an embodiment, when determining the first information table, the determining unit 902 is configured to:

send a third NS message to a plurality of devices based on the first IP address of the first device, where a target address of the third NS message is the first IP address, the plurality of devices belong to a same link, and the plurality of devices include a second device;

receive a third NA message from the second device, where the third NA message includes a second IP address and the second media access control address, the second IP address is an IP address of the second device, and the second IP address is the same as the first IP address; and determine the first information table based on the second IP address and the second media access control address.

In an embodiment, when determining the first information table based on the second IP address and the second media access control address, the determining unit 902 is configured to:

create the first information table when the first information table does not exist, where the first information table includes the second IP address and the second media access control address, and a state of the first information table is a reachable state.

In an embodiment, when determining the first information table based on the second IP address and the second media access control address, the determining unit 902 is configured to:

when a state of a first entry in the first information table is an unreachable state, change the state of the first entry to a reachable state, where the first entry includes the second IP address and the second media access control address.

In an embodiment, when sending the third NS message to the plurality of devices based on the first IP address of the first device, the determining unit 902 is configured to:

when an address detection solicitation is received from the first device, send the third NS message to the plurality of devices, where the address detection solicitation includes the first IP address.

In an embodiment, the determining unit 902 is further configured to:

when the second IP address exists in the second information table, determine whether a state of an entry corresponding to the second IP address in the first information table is the reachable state.

In an embodiment, the communication apparatus 900 further includes:

the sending unit 904, configured to: when the state of the entry corresponding to the second IP address in the first information table is the reachable state, send an address detection response message to the first device, where the address detection response message indicates that the first IP address is unavailable.

For more detailed descriptions of the receiving unit 901, the determining unit 902, the detection unit 903, and the sending unit 904, directly refer to the related descriptions of the first apparatus in the method embodiments shown in FIG. 6 to FIG. 8. Details are not described herein.

Figure 10:
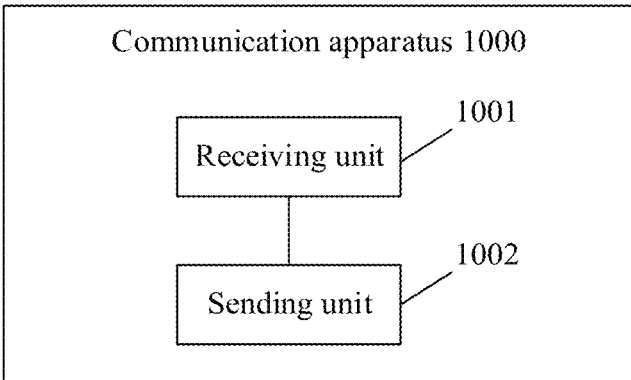
FIG. 10 is a diagram of a structure of a communication apparatus according to an embodiment of this application.

FIG. 10 is a diagram of a structure of a communication apparatus according to an embodiment of this application. The apparatus may be a second device, or may be a module (for example, a chip) in the second device. As shown in FIG. 10, the apparatus 1000 includes at least a receiving unit 1001 and a sending unit 1002.

The receiving unit 1001 is configured to receive a third NS message from a first apparatus. A target address of the third NS message is a first IP address, and the first IP address is a to-be-detected IP address of a first device.

The sending unit 1002 is configured to: when a second IP address is the same as the first IP address, send a third NA message to the first apparatus. The third NA message includes the second IP address and a second media access control address, and the second IP address is an IP address of a second device.

In an embodiment, the sending unit 1002 is further configured to:

send a first NS message to the first apparatus, where the first NS message includes a second IP address and the second media access control address.

In an embodiment, the receiving unit 1001 is further configured to:

receive a second NS message from the first apparatus.

The sending unit 1002 is further configured to:

send a second NA message to the first apparatus, where the second NA message includes a second IP address and the second media access control address.

For more detailed descriptions of the receiving unit 1001 and the sending unit 1002, directly refer to the related descriptions of the second device in the method embodiments shown in FIG. 6 to FIG. 8. Details are not described herein.

Figure 11:
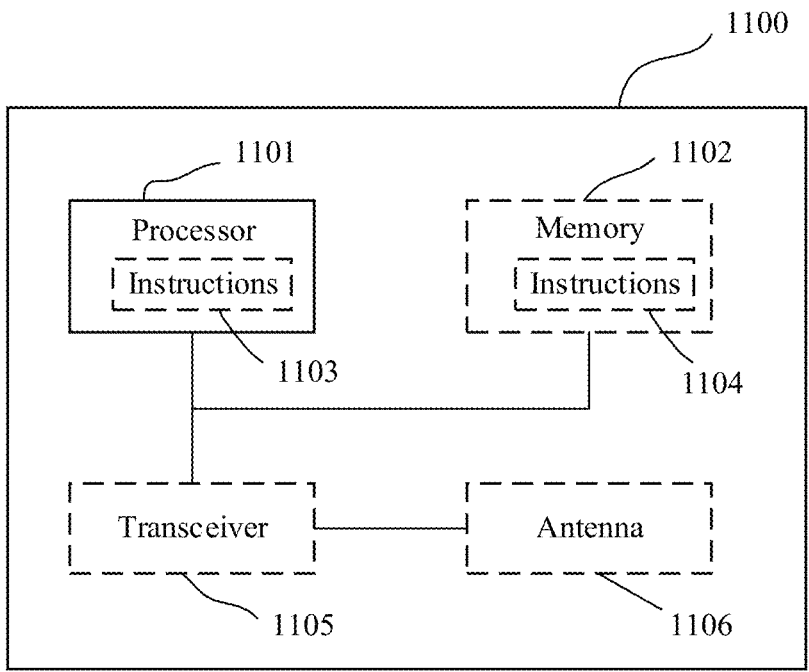
FIG. 11 is a diagram of a structure of a communication apparatus according to an embodiment of this application.

Based on the foregoing system architecture, FIG. 11 is a diagram of a structure of a communication apparatus according to an embodiment of this application. As shown in FIG. 11, the apparatus 1100 may include one or more processors 1101. The processor 1101 may also be referred to as a processing unit, and may implement a control function. The processor 1101 may be a general-purpose processor, a dedicated processor, or the like. For example, the processor 1101 may be a baseband processor or a central processing unit. The baseband processor may be configured to process a communication protocol and communication data. The central processing unit may be configured to control a communication apparatus (for example, a router, a router chip, a terminal, or a terminal chip), execute a software program, and process data of the software program.

In an embodiment, the processor 1101 may also store instructions and/or data 1103, and the instructions and/or the data 1103 may be run on the processor, so that the apparatus 1100 performs the method described in the foregoing method embodiments.

In an embodiment, the processor 1101 may include a transceiver unit configured to implement receiving and sending functions. For example, the transceiver unit may be a transceiver circuit, an interface, an interface circuit, or a communication interface. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In an embodiment, the apparatus 1100 may include a circuit. The circuit may implement the sending, receiving, or communication function in the foregoing method embodiments.

In an embodiment, the apparatus 1100 may include one or more memories 1102. The memory may store instructions 1104, and the instructions may be run on the processor, so that the apparatus 1100 performs the method described in the foregoing method embodiments. In an embodiment, the memory may further store data. In an embodiment, the processor may also store instructions and/or data. The processor and the memory may be separately disposed, or may be integrated together. For example, the correspondence described in the foregoing method embodiments may be stored in the memory or stored in the processor.

In an embodiment, the apparatus 1100 may further include a transceiver 1105 and/or an antenna 1106. The processor 1101 may be referred to as a processing unit, and control the apparatus 1100. The transceiver 1105 may be referred to as a transceiver unit, a transceiver machine, a transceiver circuit, a transceiver apparatus, a transceiver module, or the like, and is configured to implement a transceiver function.

In an embodiment, the apparatus 1100 in an embodiment of the application may be configured to perform the method described in FIG. 6 to FIG. 8 in embodiments of this application.

In an embodiment, the communication apparatus 1100 may be a first apparatus, or may be a module (for example, a chip) in the first apparatus. When computer program instructions stored in the memory 1102 are executed, the processor 1101 is configured to control the determining unit 902 and the detection unit 903 to perform operations performed in the foregoing embodiment. The transceiver 1105 is configured to receive information from another communication apparatus other than the communication apparatus. The transceiver 1105 is further configured to perform operations performed by the receiving unit 901 and the sending unit 904 in the foregoing embodiment. The first apparatus or the module in the first apparatus may be further configured to perform various methods performed by the first apparatus in the method embodiments in FIG. 7 to FIG. 9. Details are not described again.

In an embodiment, the communication apparatus 1100 may be a second device, or may be a module (for example, a chip) in the second device. When computer program instructions stored in the memory 1102 are executed, the transceiver 1105 is configured to receive information from another communication apparatus other than the communication apparatus. The transceiver 1105 is further configured to perform operations performed by the receiving unit 1001 and the sending unit 1002 in the foregoing embodiment. The second device or the module in the second device may be further configured to perform various methods performed by the second device in the method embodiments in FIG. 6 to FIG. 8. Details are not described again.

The processor and the transceiver described in this application may be implemented in an integrated circuit (IC), an analog IC, a radio frequency integrated circuit RFIC, a mixed signal IC, an application specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (nMetal-oxide-semiconductor, NMOS), a positive channel metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal. However, a range of the apparatus described in this application is not limited thereto, and the structure of the apparatus may not be limited to FIG. 11. The apparatus may be an independent device, or may be a part of a larger device. For example, the apparatus may be:

(1) an independent integrated circuit IC, a chip, or a chip system or subsystem;

(2) a set of one or more ICs, where in an embodiment, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) another device.

An embodiment of this application further provides a computer-readable storage medium. The computer-readable storage medium stores a computer program. When the program is executed by a processor, a procedure related to a network device in the address detection method provided in the foregoing method embodiments may be implemented.

An embodiment of this application further provides a computer-readable storage medium. The computer-readable storage medium stores a computer program. When the program is executed by a processor, a procedure related to a terminal device in the address detection method provided in the foregoing method embodiments may be implemented.

An embodiment of this application further provides a computer program product. When the computer program product runs on a computer or a processor, the computer or the processor is enabled to perform one or more operations in any one of the foregoing address detection methods. When the foregoing modules in the device are implemented in a form of a software functional unit and sold or used as an independent product, the modules may be stored in a computer-readable storage medium.

An embodiment of this application further provides a chip system, including at least one processor and a communication interface. The communication interface and the at least one processor are interconnected through a line. The at least one processor is configured to run a computer program or instructions, to perform some or all of the operations recorded in any one of the method embodiments corresponding to FIG. 6 to FIG. 8. The chip system may include a chip, or may include a chip and another discrete component.

An embodiment of this application further discloses a communication system. The system may include a terminal device and a network device. For detailed descriptions, refer to the foregoing address detection methods shown in FIG. 6 to FIG. 8.

It should be understood that, the memory mentioned in embodiments of this application may be a volatile memory or a nonvolatile memory, or may include both a volatile memory and a nonvolatile memory. The nonvolatile memory may be a hard disk drive (HDD), a solid-state drive (SSD), a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. In an example instead of limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

It should be understood that the processor mentioned in embodiments of this application may be a central processing unit (CPU), or may be another general-purpose processor, a digital signal processor (DSP), an application specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

Persons of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a ROM, a RAM, a magnetic disk, or an optical disc.

A sequence of the operations of the method in embodiments of this application may be adjusted, combined, or removed based on an actual requirement.

The modules/units in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An address detection method performed by a first apparatus, comprising:

receiving a first internet protocol (IP) address from a first device, wherein the first IP address is an IP address of the first device to be detected;

determining a first information table comprising an IP address of one or more devices, wherein the one or more devices and the first apparatus are at a media access control (MAC) layer of a same network;

determining a second information table based on the first information table;

detecting whether a second IP address the same as the first IP address exists in the second information table, wherein a first media access control address corresponding to the first IP address is different from a second media access control address corresponding to the second IP address; and when a state of an entry corresponding to the second IP address in the first information table is a reachable state, sending an address detection response message to the first device.

2. The method according to claim 1, wherein the determining the second information table based on the first information table comprises:

updating the second information table based on the first information table.

3. The method according to claim 1, wherein the determining the second information table based on the first information table comprises:

creating the second information table comprising the IP address of the one or more devices in the first information table.

4. The method according to claim 1, wherein the determining the first information table comprises:

receiving a first neighbor solicitation (NS) message from a second device, wherein the first NS message comprises the second IP address and the second media access control address, and wherein the second IP address is an IP address of the second device; and storing the second IP address and the second media access control address into a first entry in the first information table, wherein a state of the first entry is the reachable state.

5. The method according to claim 1, wherein the determining the first information table comprises:

sending a second neighbor solicitation (NS) message to a second device;

receiving a second neighbor advertisement (NA) message from the second device, wherein the second NA message comprises the second IP address and the second media access control address, and wherein the second IP address is an IP address of the second device; and storing the second IP address and the second media access control address into a first entry in the first information table, wherein a state of the first entry is the reachable state.

6. The method according to claim 1, wherein the determining the first information table comprises:

sending a third NS message to a plurality of devices based on the first IP address of the first device, wherein a target address of the third NS message is the first IP address, the plurality of devices belong to a same link, and the plurality of devices comprise a second device;

receiving a third NA message from the second device, wherein the third NA message comprises the second IP address and the second media access control address, the second IP address is an IP address of the second device, and the second IP address is the same as the first IP address; and determining the first information table based on the second IP address and the second media access control address.

7. The method according to claim 6, wherein the determining the first information table based on the second IP address and the second media access control address comprises:

creating the first information table when the first information table does not exist, wherein the first information table comprises the second IP address and the second media access control address, and wherein a state of the first information table is the reachable state.

8. The method according to claim 6, wherein the determining the first information table based on the second IP address and the second media access control address comprises:

when a state of a first entry in the first information table is an unreachable state, changing the state of the first entry to the reachable state, wherein the first entry comprises the second IP address and the second media access control address.

9. The method according to claim 6, wherein the sending the third NS message to the plurality of devices based on the first IP address of the first device comprises:

when receiving an address detection solicitation from the first device, sending the third NS message to the plurality of devices, wherein the address detection solicitation comprises the first IP address.

10. The method according to claim 1, further comprising:

when the second IP address exists in the second information table, determining whether the state of the entry corresponding to the second IP address in the first information table is the reachable state.

11. The method according to claim 10, wherein the address detection response message indicates that the first IP address is unavailable.

12. An apparatus, comprising:

a processor; and a memory coupled to the processor to store instructions, which when executed by the processor, cause the apparatus to:

receive a first internet protocol (IP) address from a first device, wherein the first IP address is an IP address of the first device to be detected;

determine a first information table comprising an IP address of one or more devices, wherein the one or more devices and a first apparatus are at a media access control (MAC) layer of a same network;

determine a second information table based on the first information table; and detect whether a second IP address the same as the first IP address exists in the second information table, wherein a first media access control address corresponding to the first IP address is different from a second media access control address corresponding to the second IP address; and when a state of an entry corresponding to the second IP address in the first information table is a reachable state, sending an address detection response message to the first device.

13. The apparatus according to claim 12, wherein when determining the second information table based on the first information table, the instructions further cause the apparatus to:

update the second information table based on the first information table.

14. The apparatus according to claim 12, wherein when determining the second information table based on the first information table, the instructions cause the apparatus to:

create the second information table comprising the IP address of the one or more devices in the first information table.

15. The apparatus according to claim 12, wherein when determining the first information table, the instructions further cause the apparatus to:

receive a first neighbor solicitation (NS) message from a second device, wherein the first NS message comprises the second IP address and the second media access control address, and wherein the second IP address is an IP address of the second device; and store the second IP address and the second media access control address into a first entry in the first information table, wherein a state of the first entry is the reachable state.

16. The apparatus according to claim 12, wherein when determining the first information table, the instructions further cause the apparatus to:

send a second neighbor solicitation (NS) message to a second device;

receive a second neighbor advertisement (NA) message from the second device, wherein the second NA message comprises the second IP address and the second media access control address, and wherein the second IP address is an IP address of the second device; and store the second IP address and the second media access control address into a first entry in the first information table, wherein a state of the first entry is the reachable state.

17. The apparatus according to claim 12, wherein when determining the first information table, the instructions further cause the apparatus to:

send a third NS message to a plurality of devices based on the first IP address of the first device, wherein a target address of the third NS message is the first IP address, the plurality of devices belong to a same link, and the plurality of devices comprise a second device;

receive a third NA message from the second device, wherein the third NA message comprises the second IP address and the second media access control address, the second IP address is an IP address of the second device, and the second IP address is the same as the first IP address; and determine the first information table based on the second IP address and the second media access control address.

18. The apparatus according to claim 17, wherein when determining the first information table based on the second IP address and the second media access control address, the instructions further cause the apparatus to:

create the first information table when the first information table does not exist, wherein the first information table comprises the second IP address and the second media access control address, and wherein a state of the first information table is the reachable state.

19. The apparatus according to claim 17, wherein when determining the first information table based on the second IP address and the second media access control address, the instructions further cause the apparatus to:

when a state of a first entry in the first information table is an unreachable state, change the state of the first entry to the reachable state, wherein the first entry comprises the second IP address and the second media access control address.

20. The apparatus according to claim 15, wherein when sending a third NS message to a plurality of devices based on the first IP address of the first device, the instructions further cause the apparatus to:

when an address detection solicitation is received from the first device, send the third NS message to the plurality of devices, wherein the address detection solicitation comprises the first IP address.

* * * * *